(12) United States Patent
Suzuki et al.

(10) Patent No.: US 11,657,244 B2
(45) Date of Patent: May 23, 2023

(54) INFORMATION CODE READING SYSTEM

(71) Applicant: DENSO WAVE INCORPORATED, Aichi-pref. (JP)

(72) Inventors: Tomohito Suzuki, Chita-gun (JP); Yuichi Ito, Chita-gun (JP); Ryohei Kagami, Chita-gun (JP); Koji Konosu, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/639,861

(22) PCT Filed: Sep. 1, 2020

(86) PCT No.: PCT/JP2020/033047
§ 371 (c)(1),
(2) Date: Mar. 2, 2022

(87) PCT Pub. No.: WO2021/045040
PCT Pub. Date: Mar. 11, 2021

(65) Prior Publication Data
US 2022/0343093 A1 Oct. 27, 2022

(30) Foreign Application Priority Data

Sep. 2, 2019 (JP) ............................. JP2019-159733
Aug. 20, 2020 (JP) ............................. JP2020-139384

(51) Int. Cl.
*G06K 7/14* (2006.01)
*G06K 19/06* (2006.01)

(52) U.S. Cl.
CPC .......... *G06K 7/1491* (2013.01); *G06K 7/1417* (2013.01); *G06K 7/1465* (2013.01);
(Continued)

(58) Field of Classification Search
CPC .. G06K 7/1491; G06K 7/1417; G06K 7/1465; G06K 19/06037; G06K 19/06093; G06K 19/06112
See application file for complete search history.

(56) References Cited

U.S. PATENT DOCUMENTS

2018/0114083 A1   4/2018   Richter et al.

FOREIGN PATENT DOCUMENTS

| JP | 2006-195912 A | 7/2006 |
| JP | 2007-079781 A | 3/2007 |

(Continued)

OTHER PUBLICATIONS

Dec. 8, 2020 International Search Report issued in International Patent Application No. PCT/JP2020/033047.

*Primary Examiner* — Laura A Gudorf
(74) *Attorney, Agent, or Firm* — Oliff PLC

(57) ABSTRACT

A system contributing to prevention of unauthorized use of an information code displayed on a screen. In the system, an information code display device cyclically displays a plurality of partial code images on a display screen of a display unit based on a first rule when the first rule is received from a server in response to a first request to the server. Accordingly, an information code reading device captures images of the display screen at imaging intervals according to a second rule which is received from the server by in response to a second request to the server to decode an information code composed of the plurality of images thus captured, according to the second rule.

18 Claims, 29 Drawing Sheets

(52) U.S. Cl.
CPC . *G06K 19/06037* (2013.01); *G06K 19/06093* (2013.01); *G06K 19/06112* (2013.01)

(56) References Cited

FOREIGN PATENT DOCUMENTS

| | | | |
|---|---|---|---|
| JP | 2016-062260 A | | 4/2016 |
| JP | 2018-028807 A | | 2/2018 |
| TW | 201741939 A | * | 12/2017 |

* cited by examiner

FIG.4
(A)
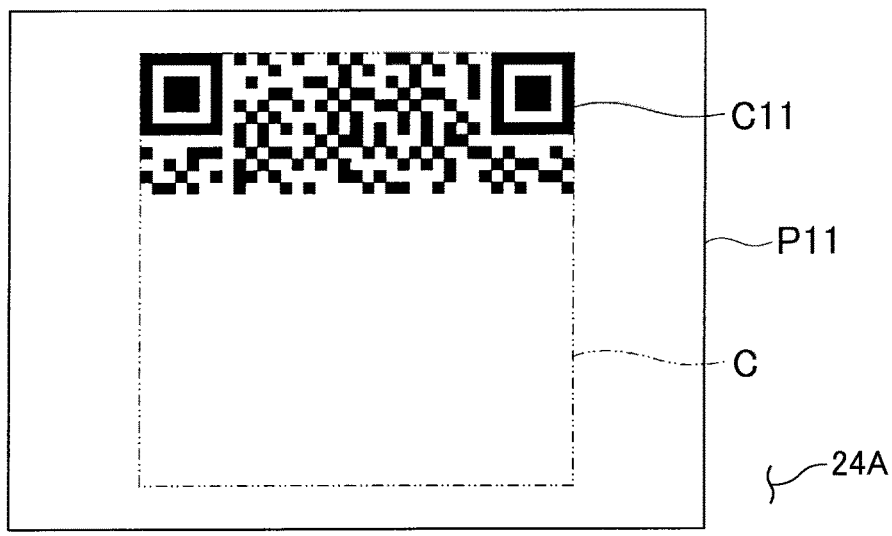
(B)
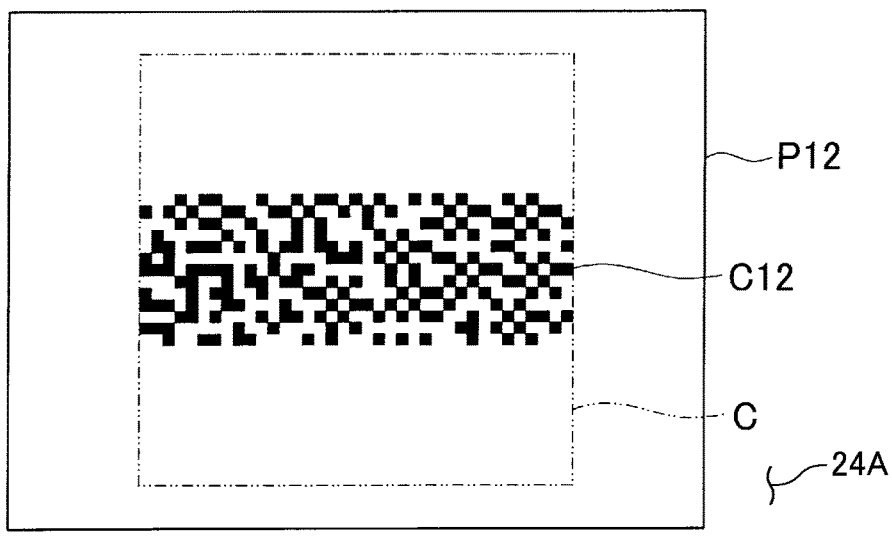
(C)
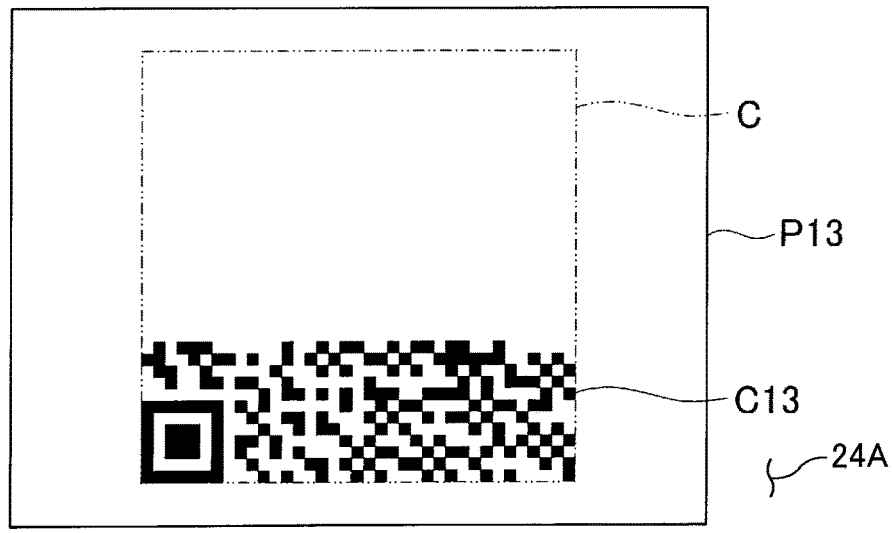

FIG.5
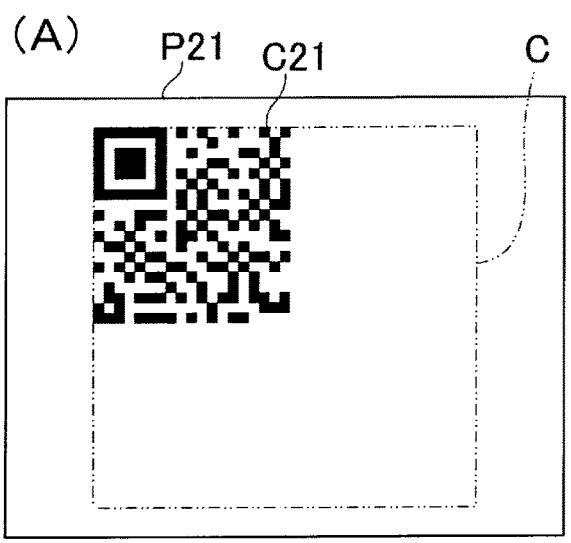
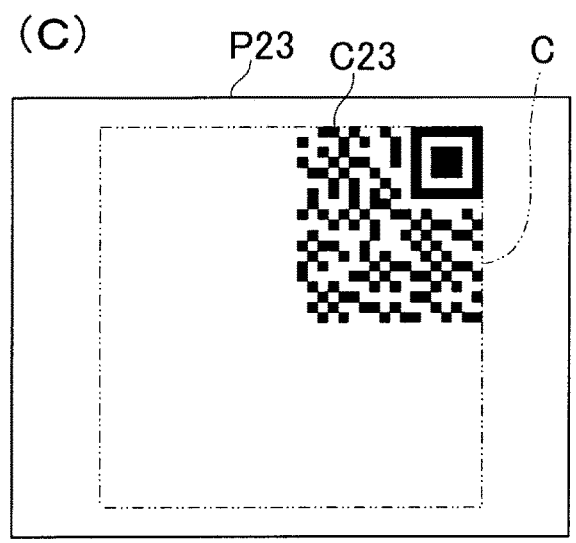
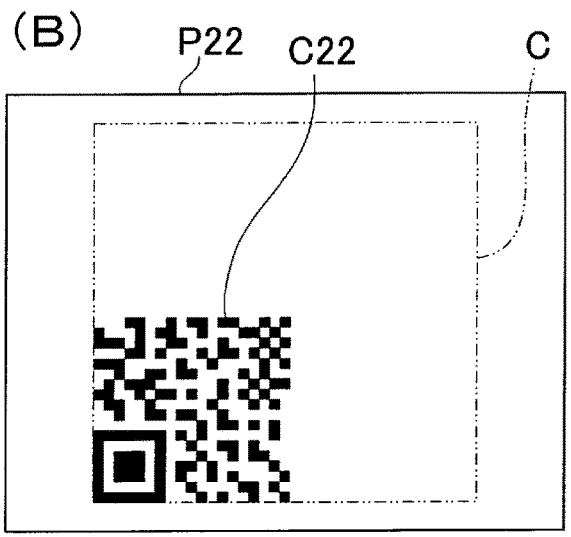
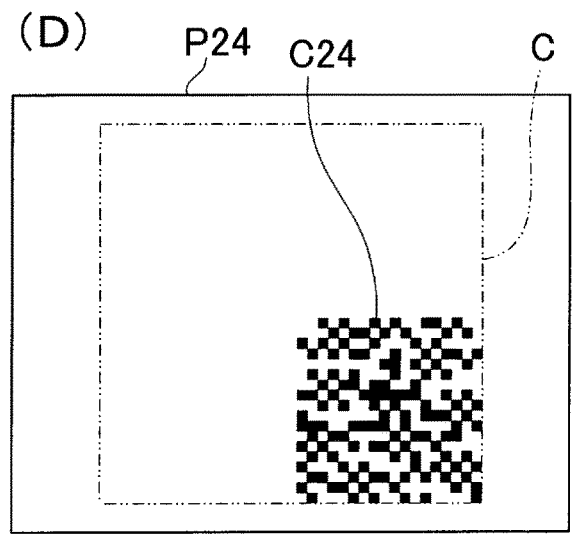

FIG.11
(A)
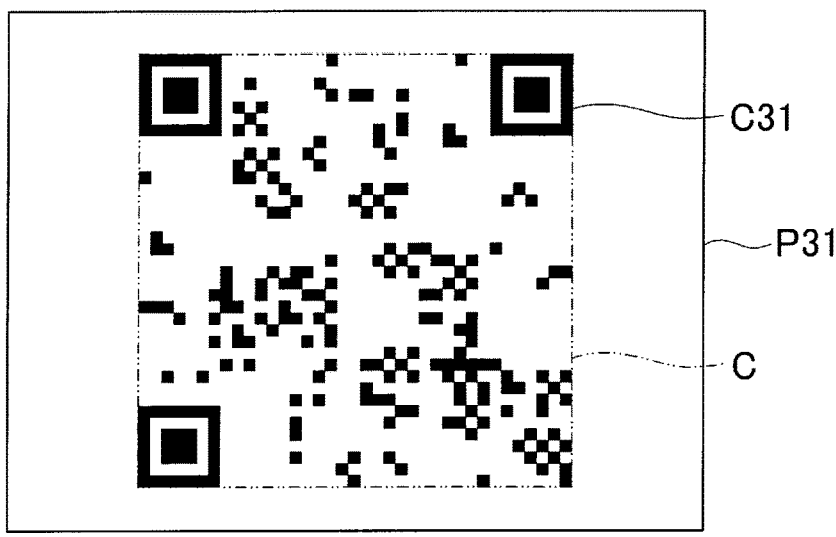
(B)
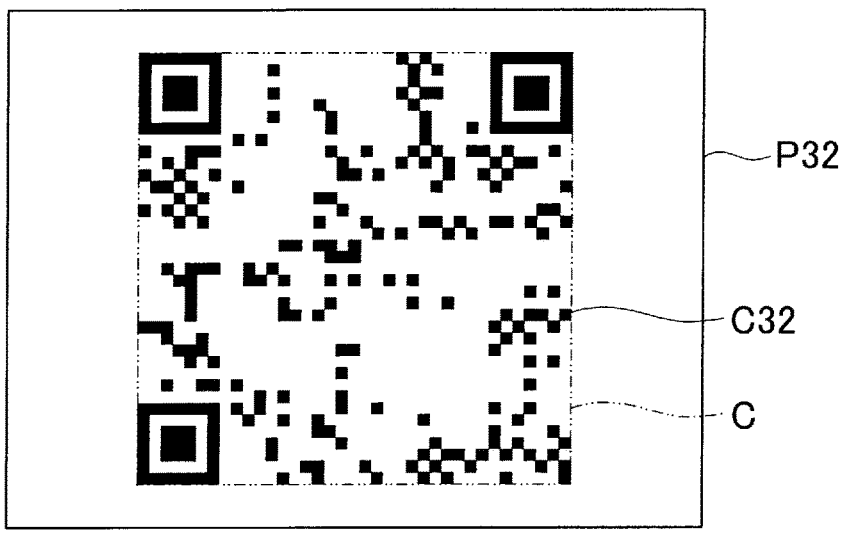
(C)
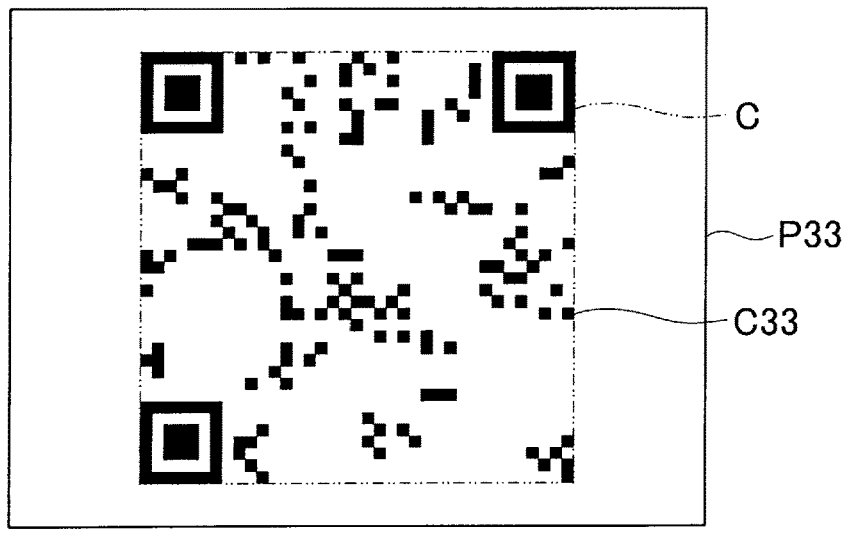

FIG.22
(A)
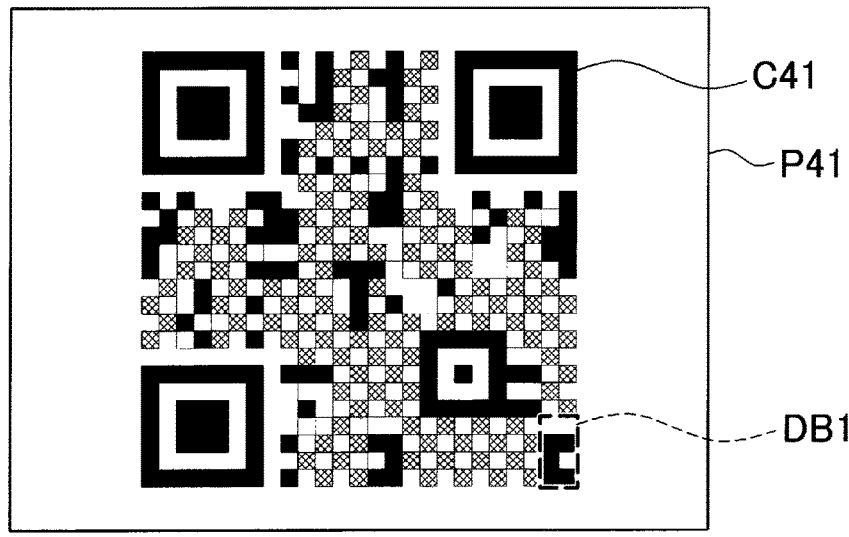
(B)
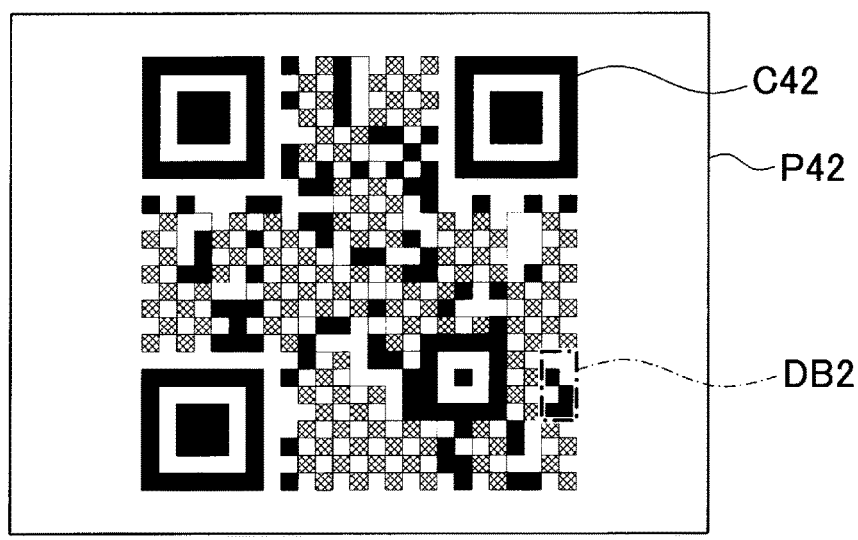
(C)
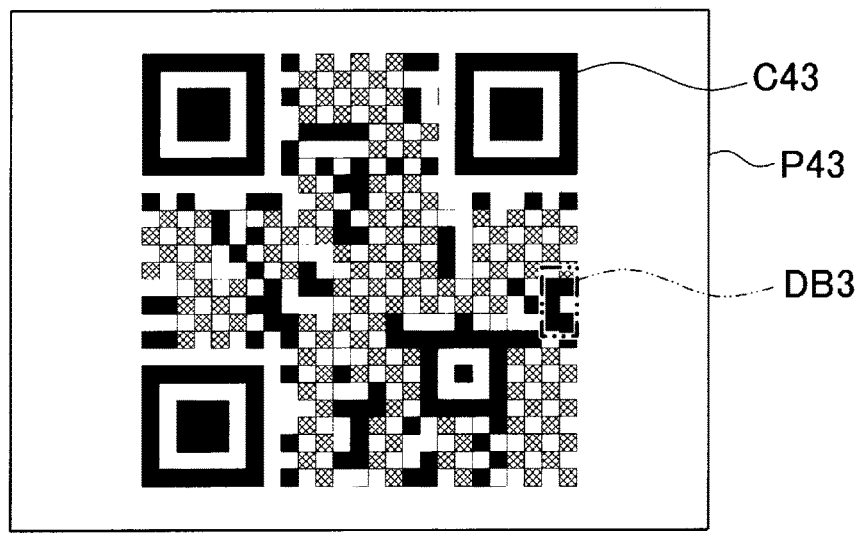

FIG.23
(A)
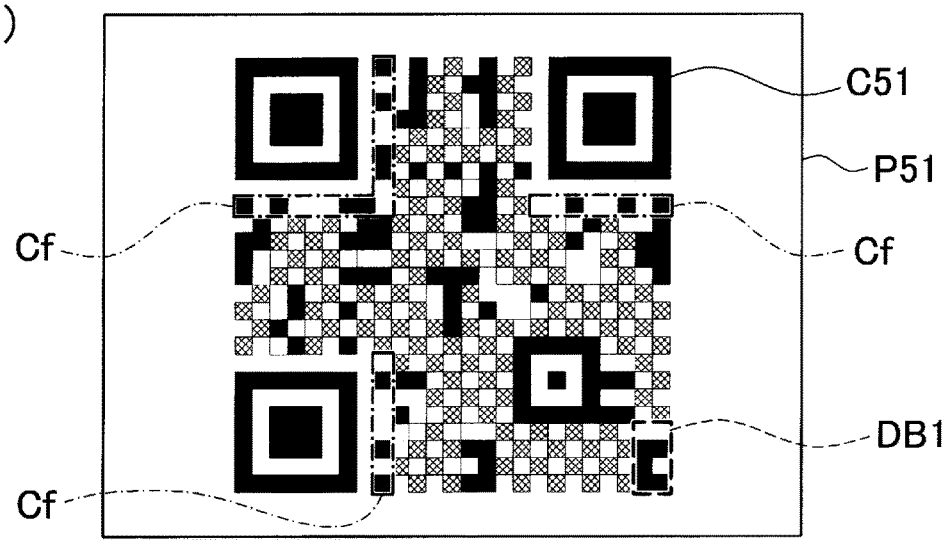
(B)
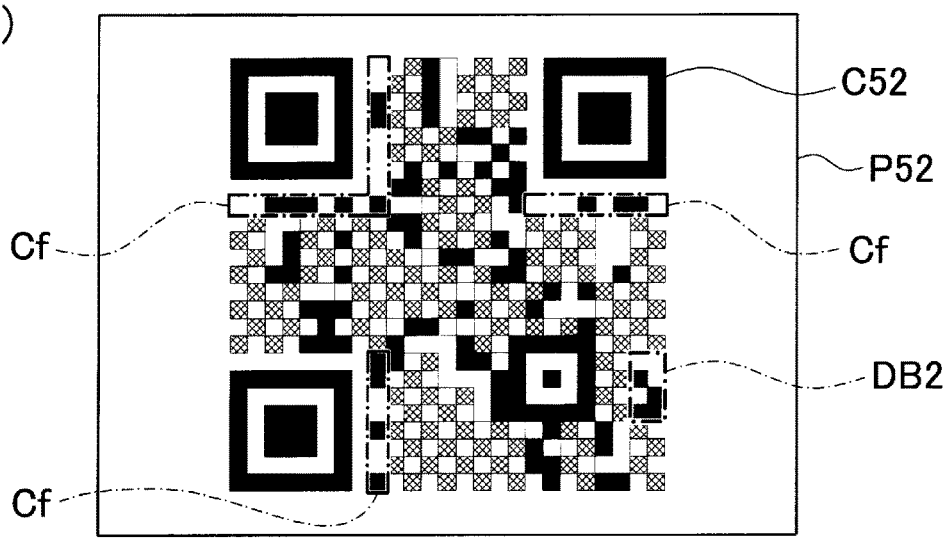
(C)
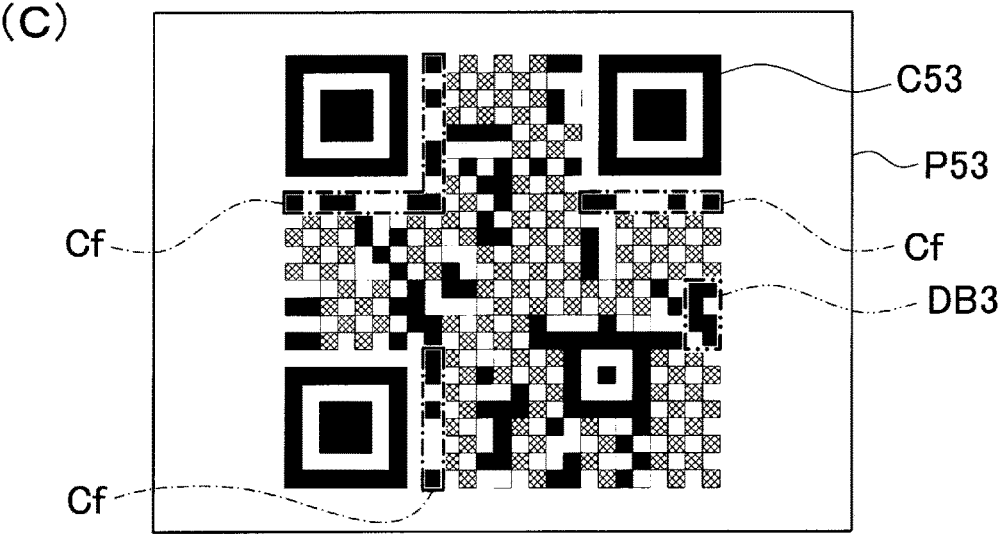

FIG.24

|  | DB1 | DB2 | DB3 | DB4 | · · · |
|---|---|---|---|---|---|
| ORIGINAL CODE | CODEWORD 1 | CODEWORD 2 | CODEWORD 3 | CODEWORD 4 | · · · |
| FIRST COMBINATION CODE | CODEWORD 1 | DUMMY | DUMMY | CODEWORD 4 | · · · |
| SECOND COMBINATION CODE | DUMMY | CODEWORD 2 | DUMMY | DUMMY | · · · |
| THIRD COMBINATION CODE | DUMMY | DUMMY | CODEWORD 3 | DUMMY | · · · |
| DETERMINATION CODE | PARITY 1 | PARITY 2 | PARITY 3 | PARITY 4 | · · · |

FIG.26
(A)
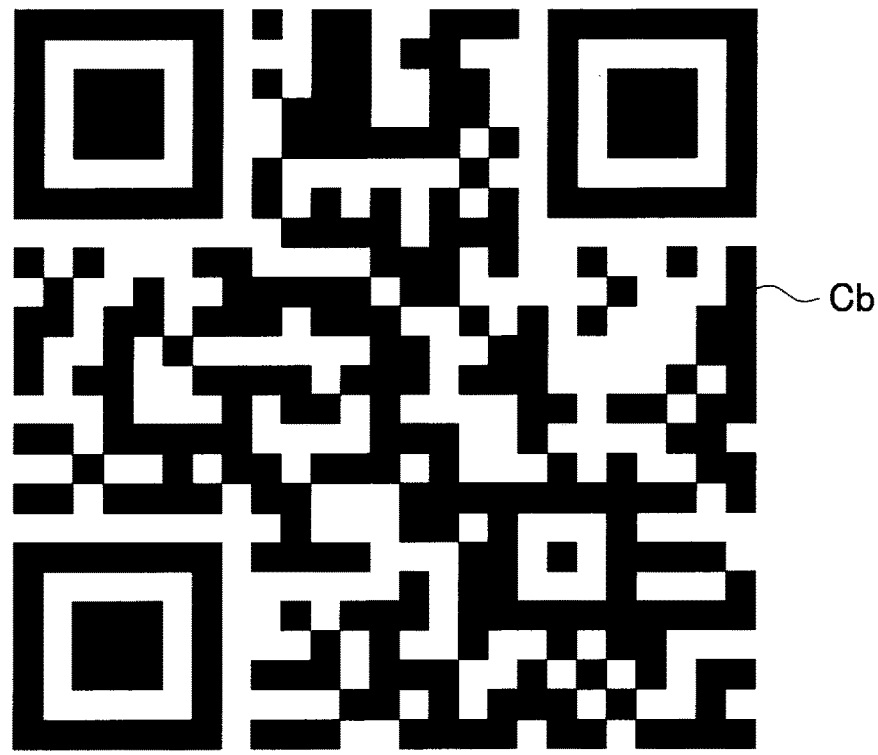
(B)
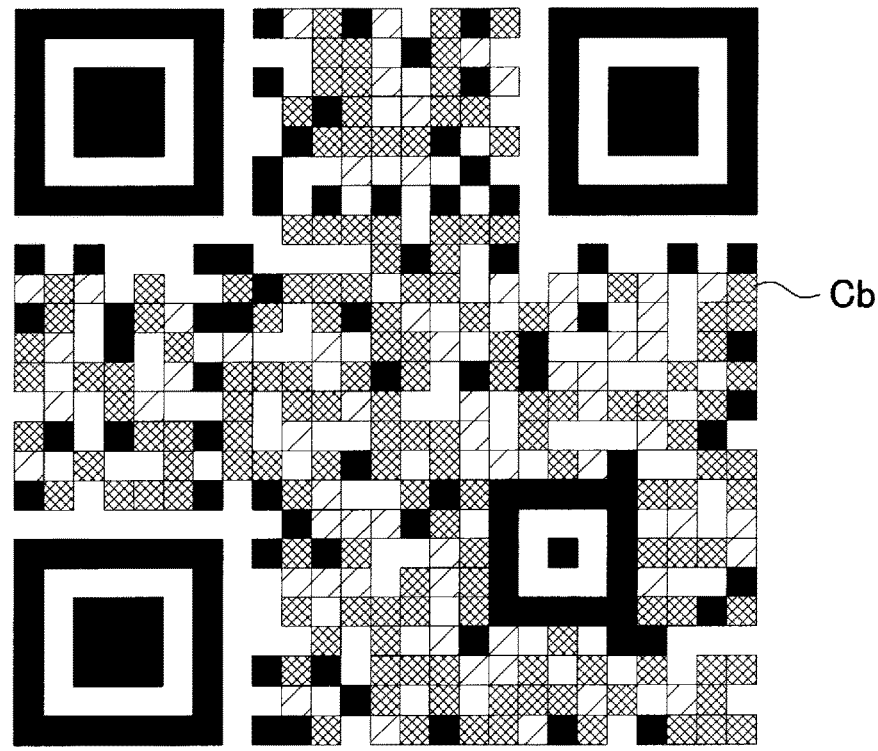

FIG.27
(A)
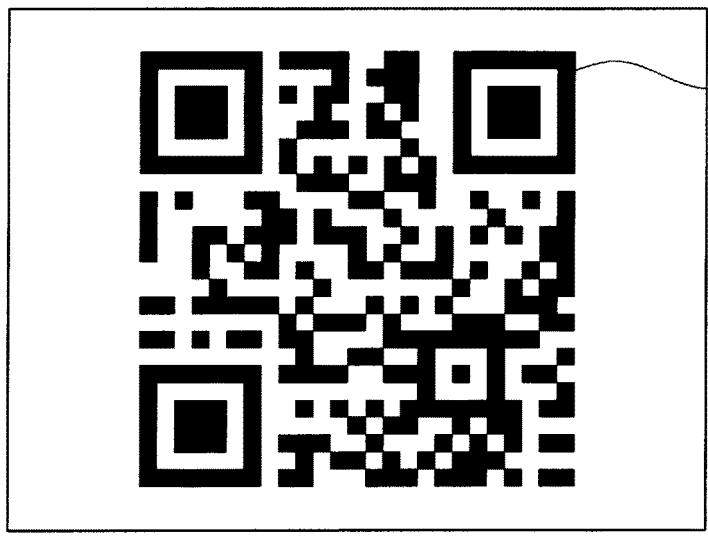
(B)
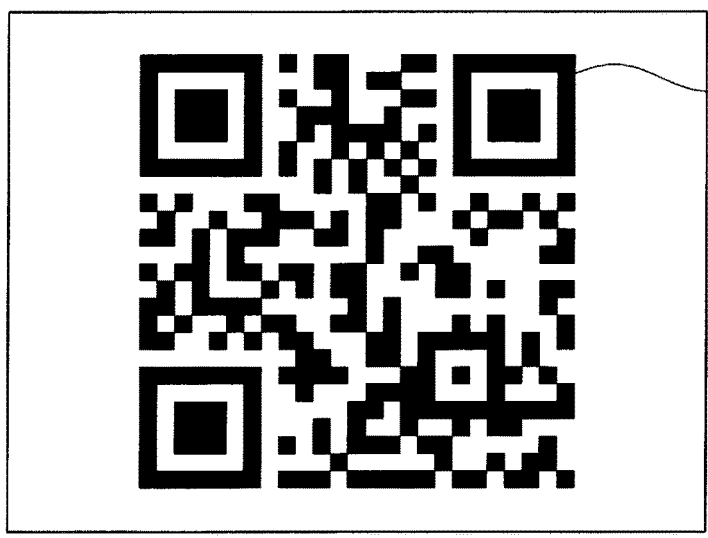
(C)
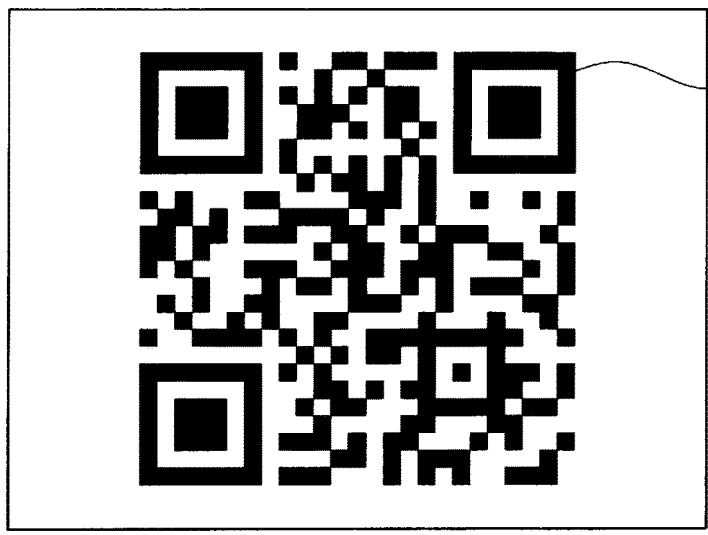

E1  E2  E3

INFORMATION CODE READING SYSTEM

CROSS-REFERENCE TO RELATED APPLICATION

This application is based on and claims the benefit of priority from earlier Japanese Patent Applications No. 2019-159733 filed on Sep. 2, 2019 and No. 2020-139384 filed on Aug. 20, 2020 the descriptions of which are incorporated herein by reference.

BACKGROUND

Technical Field

The present invention relates to an information code reading system in which an information code is read by an information code reading device using information displayed on the screen of an information code display device.

Related Art

Currently, information codes, such as barcodes or QR codes (registered trademark), are used in various applications, and purposes of their use are being diversified. For example, an information code displayed on a screen can be imaged and optically read using a mobile terminal having a camera, so that predetermined information corresponding to the information code can be easily acquired. Furthermore, there can be provided a system in which an encrypted information code is delivered to a user and the user displays the delivered information code on a screen, so that a store or the like where the information code on the screen is shown can provide services according to the information code, identify the user, or present values to the user.

CITATION LIST

Patent Literatures

[PTL 1] JP 2007-079781 A[0004]
replicated, which raises issues from the perspective of security or operational safety. For example, if a QR code imparted with financial information is imaged and replicated, the financial information may be fraudulently used. Also, for example, if a QR code for authentication is imaged and replicated, the authentication information may be fraudulently used.

As measures against these issues, PTL 1, for example, discloses a split screen method. In this method, a two-dimensional code is displayed being split into multiple two-dimensional code segments so that the two-dimensional code information cannot be acquired by simply imaging one two-dimensional code segment displayed. However, simply splitting one information code into multiple code segments may raise an issue of allowing replication of the original information code by imaging all the split code segments and combining the imaged segments.

SUMMARY

Thus it is desired to provide a configuration contributing to preventing unauthorized use of an information code displayed on a screen.

In order to achieve the above aim, a first exemplary example is:
an information code reading system comprising an information code display device, an information code reading device, and a server that can communicate with the information code display device and the information code reading device, wherein
the information code display device includes
a display side communication unit that receives a first rule transmitted from the server in response to a first request to the server,
a partial code image preparation unit that prepares a plurality of types of partial code images when the first rule is received by the display side communication unit, each partial code image being produced as a result of removing part of cells configuring a code area of an information code, on which predetermined information is recorded, from an image of the information code so as to meet the first rule, and
a display unit that cyclically displays the plurality of partial code images prepared by the partial code image preparation unit on a display screen, based on the first rule;
the information code reading device includes
a reading side communication unit that receives a second rule transmitted from the server in response to a second request to the server,
an imaging unit that captures images of the display screen at imaging intervals according to the second rule when the second rule is received by the reading side communication unit,
a combination unit that composes one information code from a plurality of images captured by the imaging unit, based on the second rule, and
a decoding unit that decodes the information code composed by the combination unit; and
the server includes
a setting unit that sets a rule related to display of the partial code images according to time of receiving a request, and
a server side communication unit that transmits a rule to the information code display device as the first rule when the first request is received from the information code display device, the rule being set by the setting unit according to time of receiving the first request, and transmits a rule to the information code reading device as the second rule when the second request is received from the information code reading device, the rule being set by the setting unit according to time of receiving the second request.

A second exemplary example is:
an information code reading system comprising an information code display device, an information code reading device, and a server that can communicate with the information code display device and the information code reading device, wherein
the information code display device includes
a display side communication unit that receives a first rule transmitted from the server in response to a first request to the server,
a storage unit that stores a plurality of information codes, and
a display unit that displays the plurality of information codes on a display screen based on the first rule received by the display side communication unit;
the information code reading device includes
a reading side communication unit that receives a second rule transmitted from the server in response to a second request to the server, an imaging unit that captures images of the display screen at imaging intervals according to the second rule when the second rule is received by the reading side communication unit, a decoding unit that performs decoding processing in which an information code is decoded for the plurality of serial images captured by the imaging unit, and a notification unit that performs predetermined notification in the case where decoding results of decoding the serial images performed by the decoding unit are different from results estimated from the second rule; and the server includes a setting unit that sets a rule related to display of information codes according to time of receiving a request, and a server side communication unit that transmits a rule to the information code display device as the first rule when the first request is received from the information code display device, the rule being set by the setting unit according to time of receiving the first request, and transmits a rule to the information code reading device as the second rule when the second request is received from the information code reading device, the rule being set by the setting unit according to time of receiving the second request.

A fifth exemplary example is:

an information code reading system comprising an information code display device and an information code reading device, wherein the information code display device includes a code image preparation unit that prepares a plurality of types of combination code images according to a predetermined rule, with part of cells replaced, by changing positions of replacement cell areas as targets of replacement, based on an information code on which predetermined information is recorded using cells arranged in a code area, and a display unit that cyclically displays the plurality of types of combination code images prepared by the code image preparation unit on a display screen; and the information code reading device includes an imaging unit that captures images of the display screen at predetermined imaging intervals, a combination unit that composes one information code according to the predetermined rule, from a plurality of images captured by the imaging unit, and a decoding unit that decodes an information code composed by the combination unit.

It should be noted that the above bracketed reference signs indicate correspondence with specific means in the embodiments described later.

In the first exemplary example, when a first rule is received by the information code display device from a server in response to a first request to the server, a plurality of types of partial code images are prepared from an image of an information code on which predetermined information is recorded, each partial code image being produced as a result of removing part of cells configuring a code area of the information code so as to meet the first rule. The plurality of partial code images prepared in this way are cyclically displayed on a display screen (medium carrying the code) of a display based on the first rule. Then, when a second rule is received in the information code reading device from the server in response to a second request to the server, images of the display screen are captured at imaging intervals according to the second rule to decode one information code that has been composed according to the second rule using the plurality of images thus captured. The server is ensured to set a rule, which is related to display of the partial code images, according to time of receiving a request. Specifically, when the first request is received from the information code display device, a rule that is set according to time of receiving the first rule is transmitted to the information code display device as the first rule. When the second request is received from the information code reading device, a rule that is set according to time of receiving the second request is transmitted to the information code reading device as the second rule.

Thus, in the case where the information code reading device captures images of the display screen of the information code display device at imaging intervals according to the second rule received from the server in response to the second request, the information code display device cyclically displays partial code images, which have been prepared to meet the first rule received from the server, on the display screen based on the first rule. Therefore, if the timing of the first request and the timing of the second request are close to each other, the first rule and the second rule are set so as to be compatible with each other. Accordingly, the information code reading device can sequentially and reliably capture images of the partial code images cyclically displayed by the information code display device. The information code reading device, which can easily keep track of how the images of the partial code images are captured according to the second rule, can compose one information code from the partial code images in a decodable manner. In other words, the information code reading device can read one information code by capturing images of the display screen on which the information code images are cyclically displayed by the information code display device. On the other hand, if the display screen of the information code display device is simply imaged, only an image of one partial code image can be captured, without capturing an image of the information code on which predetermined information is recorded, and thus the information code can be prevented from being replicated. Furthermore, if the display screen of the information code display device is simply imaged multiple times, not all of the partial code images can be imaged unless the second rule received at the imaging timing is used, and thus one information code cannot be decodably composed. Thus, unauthorized use (replication) of the information code displayed on the screen can be reliably prevented.

In the second exemplary example, when a first rule is received in the information code display device from a server in response to a first request to the server, a plurality of information codes stored in the storage unit are cyclically displayed on the display screen of the display unit according to the first rule. Then, when a first rule is received in the information code reading device from the server in response to a second request to the server, images of the display screen are captured at imaging intervals according to the second rule, and decoding processing of decoding an information code is performed for the series of plurality of images thus captured. If decoding results for the images are different from those which are expected from the second rule, predetermined notification is performed. The server is ensured to set a rule related to display of an information code according to time of receiving a request. When the first request is received from the information code display device, a rule that is set according to time of receiving the first request is transmitted to the information code display device as the first rule. When the second request is received from the information code reading device, a rule that is set according to time of receiving the second request is transmitted to the information code reading device as the second rule.

Thus, in the case where the information code reading device captures images of the display screen of the information code display device at imaging intervals according to the second rule received from the server in response to the second request, the information code display device is in the act of cyclically displaying the plurality of information codes on the display screen, according to the first rule received from the server. Therefore, if the timing of the first request and the timing of the second request are close to each other, the first rule and the second rule are set so as to be compatible with each other. Accordingly, the information code reading device can sequentially capture images of all the information codes cyclically displayed by the information code display device without fail. On the other hand, if the results of the sequential decoding are different from the results estimated from the second rule, e.g., in the situation where three decoding results are expected to be obtained due to three information codes being cyclically displayed according to the second rule, if the three decoding results are the same, the information code reading device can determine that another information code or the like different from the display screen of the information code display device is being imaged, and can perform predetermined notification. In other words, if another information code or the like different from the display screen of the information code display device is being imaged, the predetermined notification can be performed. Thus, unauthorized use of an information code displayed on a screen can be reliably prevented.

In a third exemplary example, information related to an expiration period is included in a first rule. If the expiration period included in the first rule elapses from reception of the first rule, the display side communication unit newly makes a first request to the server. Thus, the information code display device can update the first rule at appropriate timing according to the expiration period included in the first rule.

In a fourth exemplary example, when a first rule is received in the information code display device, and if the display conditions following the first rule are determined not to be display conditions that are acceptable to the display unit, a display condition code is produced and displayed on the display screen. In the display condition code, information related to display conditions that are acceptable to the display unit and specific information that can specify the information code display device are recorded. Then, when the display condition code is decoded by the information reading device, a second request is made including decoding results for the display condition code. When the second request including the decoding results for the display condition code is received from the information code reading device, the server sets a first rule and a second rule so as to change display conditions according to the decoding results, and send the rules respectively to the information code display device and the information code reading device.

Thus, if the display conditions following the received first rule are conditions that are unacceptable, the state of displaying the display condition code is maintained in the information code display device, so that the display condition code can be imaged and decoded by the information code reading device. Thus, the first rule and the second rule are changed so that they can be accepted by the information code display device. Accordingly, even when display conditions that are not suitable for the display performance of the information code display device are instructed from the server through the first rule as received, the display conditions can be appropriately changed, and in addition, the information code reading device can receive a second rule according to the changed display conditions.

In the fifth exemplary example, the code image preparation unit of the information code display device prepares a plurality of types of combination code images with part of cells replaced, based on an information code on which predetermined information is recorded using cells arranged in the code area. The combination code images are prepared by changing positions of the replacement cell areas which are target of replacement. The plurality of types of combination code images thus prepared are cyclically displayed on the display screen of the display unit. In the information code reading device, images of the display screen are captured at predetermined imaging intervals, so that the combination unit can compose one information code from the plurality of images thus captured according to the predetermined rule, for decoding by the decoding unit.

Thus, in the information code reading device, one information code can be decodably composed from cells that are not targets of replacement in the combination code images, according to the predetermined rule. In other words, the information code reading device can read one information code by capturing images of the display screen of the information code display device on which the combination code images are cyclically displayed. On the other hand, if the display screen of the information code display device is simply imaged, only an image of one combination code image can be captured, without capturing an image of the information code on which predetermined information is recorded, and thus the information code can be prevented from being replicated.

Furthermore, if the display screen of the information code display device is imaged multiple times to capture images of all the combination code images, the information code on which predetermined information is recorded cannot be decodably composed unless the predetermined rule is used. Thus, unauthorized use (replication) of the information code displayed on the screen can be reliably prevented.

In a sixth exemplary example, cells in the replacement cell areas form part of a predetermined cell pattern corresponding to the code area. Thus, for example, the outline of each combination code image is prevented from becoming indistinct, which would otherwise occur due to the replacement cell areas being formed of only white cells.

In a seventh exemplary example, part of the code area is formed by arranging a plurality of data blocks each formed of a predetermined number of cells, and the replacement cell areas are set in units of data blocks. Furthermore, the predetermined rule is set for the data blocks located at the same positions in a plurality of types of combination code images, so that one of the combination code images will include a cell arrangement that is the same as that of the code area, and that the remaining combination code images will include replacement cell areas. Thus, since the replacement cell areas are set in units of data blocks in each combination code image, the replacement cell areas that are not necessary for combination can be easily distinguished from the cell areas necessary for combination, thereby reducing processing load during the combination processing performed by the combination unit.

In an eighth exemplary example, the display unit cyclically displays determination code images on the display screen, in addition to the plurality of types of combination code images prepared by the code image preparation unit, the determination code images recording determination information for determining for each data block whether cell arrangement is the same as that of the code area. Thus, using the determination information read from the imaged determination codes, it can be determined whether the composed information code is correctly composed, for each data block. Accordingly, for example, the data block that has been determined not to have the same cell arrangement is not used for correcting errors to enhance error correction performance, and thus readability can be improved.

As in the eighth exemplary example, the information code reading device may be configured to include a storage unit in which information related to the predetermined rule is stored in advance.

In a tenth exemplary example, the plurality of types of combination code images individually include information related to the predetermined rule. Thus, the information code reading device does not have to acquire the information related to the predetermined rule in advance. Thus, since the predetermined rule can be changed for each information code, security can be improved, while enhancing convenience of the system.

In an eleventh exemplary example, the code image preparation unit prepares a plurality of types of first combination code images from a first information code image on which first information is recorded, the plurality of types of first combination code images being individually prepared so that part of cell areas forming a code area of the first information code is replaced to meet the predetermined rule, and prepares a plurality of types of second combination code images from a second information code image on which second information is recorded, the plurality of types of second combination code images being individually prepared so that part of cell areas forming a code area of the second information code is replaced to meet the predetermined rule.

The plurality of types of first combination code images and the plurality of types of second combination code images prepared in this way are cyclically displayed on the display screen of the display unit. Then, the combination unit composes the first information code and the second information code from the plurality of images captured by the imaging unit, based on the predetermined rule.

Thus, in the information code reading device, images of the combination code images cyclically displayed on the display screen of the display unit are captured to read two pieces of information (first information and second information). Accordingly, unauthorized use (replication) of the information code displayed on the screen can be more reliably prevented, while increasing the amount of information that can be read.

In a twelfth exemplary example, the code image preparation unit produces and prepares a plurality of types of combination code images so that, for cells located at the same positions in a predetermined combination area targeted to cell replacement in the code area, light and darkness obtained from light and darkness of cells of the plurality of types of combination code images and the predetermined rule match light and darkness of cells of the information code.

Thus, in the information code reading device, the information code can be decodably composed based on light and darkness obtained from cells of the combination code images in the predetermined combination area and the predetermined rule. On the other hand, if the images of all the combination code images are captured by imaging the display screen of the information code display device multiple times, the information code on which predetermined information is recorded cannot be decodably composed unless the predetermined rule is used. Thus, unauthorized use (replication) of the information code displayed on the screen can be reliably prevented.

In a thirteenth exemplary example, a plurality of predetermined combination areas are set, and the predetermined rule is different between the predetermined combination areas. Thus, if the predetermined rule set for one combination area is fraudulently acquired, the information code on which predetermined information is recorded cannot be decodably composed unless acquiring other predetermined rules or information related to the combination areas in which other predetermined rules are set. Accordingly, security can be further improved for the information code displayed on the screen.

In a fourteenth exemplary example, other information code images, on which information related to the predetermined rule is recorded, are cyclically displayed on the display screen of the display unit, in addition to the plurality of types of combination code images prepared by the code image preparation unit. Thus, in the information code reading device, the set rule can be read from other information codes imaged together with the plurality of combination code images. Accordingly, the information reading device does not have to acquire information related to the predetermined rule in advance. Thus, since the predetermined rule can be changed for each information code, security can be improved, while enhancing convenience of the system.

BRIEF DESCRIPTION OF THE DRAWINGS

In the accompanying drawings:

FIG. 4 is a set of diagrams illustrating partial code images according to the first embodiment, in which FIG. 4(A) shows a partial code image P11 including a partial code C11, FIG. 4(B) shows a partial code image P12 including a partial code C12, and FIG. 4(C) shows a partial code image P13 including a partial code C13.

FIG. 5 is a set of diagrams illustrating partial code images according to the first embodiment, in which FIG. 5(A) shows a partial code image P21 including a partial code C21, FIG. (B) shows a partial code image P22 including a partial code C22, FIG. 5(C) shows a partial code image 23 including a partial code C23, and FIG. 5(D) shows a partial code image P24 including a partial code C24.

FIG. 11 is a set of diagrams illustrating partial code images according to a modification of the first embodiment, in which FIG. 11(A) shows a partial code image P31 including a partial code C31, FIG. 11(B) shows a partial code image P32 including a partial code C32, and FIG. 11(C) shows a partial code image P33 including a partial code C33.

FIG. 22 is a set of diagrams illustrating combination code images according to the fourth embodiment, in which FIG. 22(A) shows a combination code image P41 including a combination code C41, FIG. 22(B) is a combination code image P42 including a combination code C42, and FIG. 22(C) is a combination code image P43 including a combination code C43.

FIG. 23 is a set of diagrams illustrating combination code images according to a modification of the fourth embodiment, in which FIG. 23(A) shows a combination code image P51 including a combination code C51, FIG. 23(B) shows a combination code image P52 including a combination code C52, and FIG. 23(C) is a combination code image P53 including a combination code C53.

FIG. 24 is a diagram illustrating a relationship between correct codewords, dummy cells, and parities configuring each combination code according to a fifth embodiment.

FIG. 26 is a set of diagrams illustrating a principal part of an information code reading system according to a seventh embodiment, in which FIG. 26(A) shows an original code, and FIG. 26(B) shows a code corresponding to the original code of FIG. 26(A), in which cells at positions for presenting light colors with two combination codes shown in FIG. 27 are hatched, and cells at positions for presenting dark colors with two combination codes shown in FIG. 27 are cross hatched.

FIG. 27 is a set of diagrams illustrating combination code images according to the seventh embodiment, in which FIG. 27(A) shows a combination code image P61 including a combination code C61, FIG. 27(B) shows a combination code image P62 including a combination code C62, and FIG. 27(C) shows a combination code image P63 including a combination code C63.

FIG. 28 is a set of diagrams illustrating images cyclically displayed on a screen according to a modification of the seventh embodiment, in which FIG. 28(A) shows a combination code image P61, FIG. 28(B) shows a combination code image P62, FIG. 28(C) shows a combination code image P63, and FIG. 28(D) shows a different information code Cc.

DESCRIPTION OF THE EMBODIMENTS

First Embodiment

With reference to the drawings, a first embodiment of an information code reading system of the present disclosure will be described.

Figure 1:
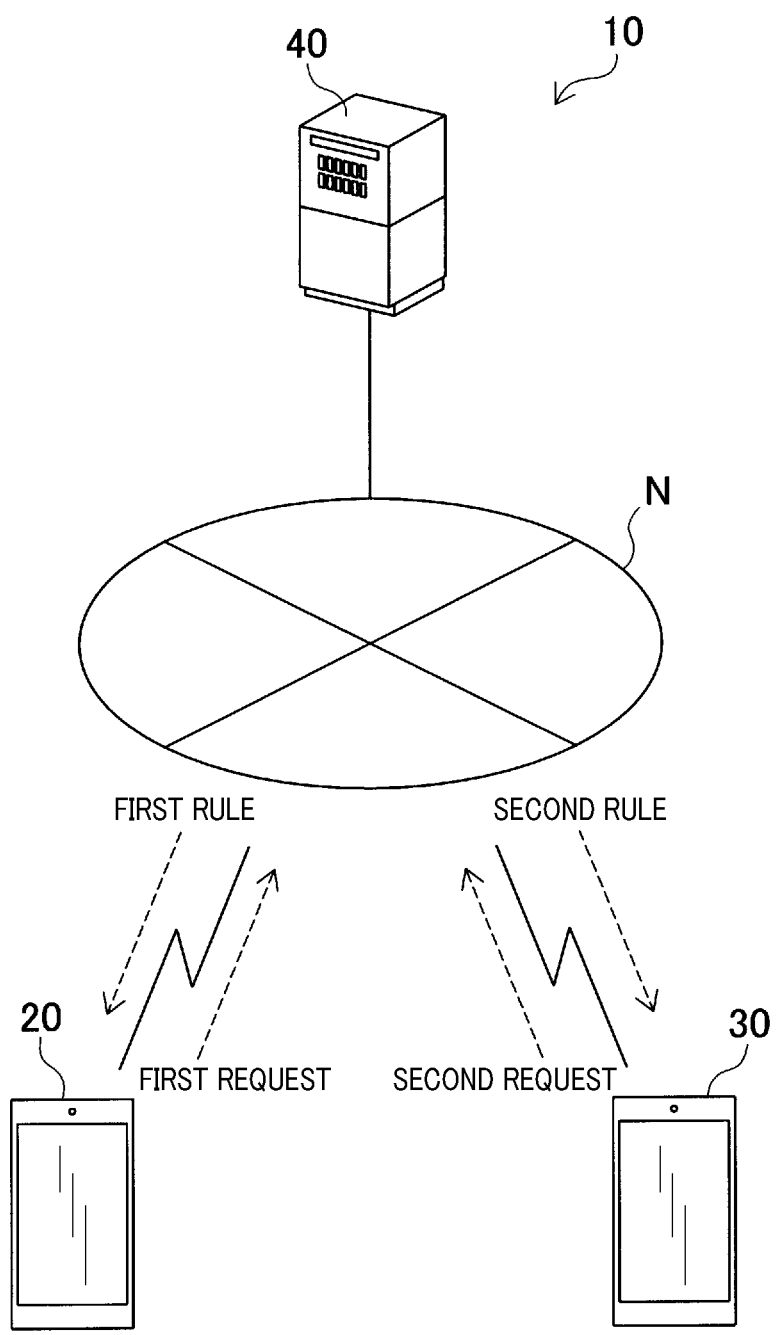
FIG. 1 is a schematic diagram illustrating a configuration of an information code reading system according to a first embodiment.

An information code reading system 10 according to the present embodiment is a system for preventing unauthorized use, such as replication, of an information code displayed on a screen of a display means, such as a display or a display unit. As shown in FIG. 1, the information code reading system 10 includes an information code display device 20, an information code reading device 30, and a server 40 that can communicate with the information code display device 20 and the information code reading device 30. More specifically, for example, the information code reading system 10 is a payment system used for payment processing performed in a POS register (not shown) installed in a store. Thus, the information code display device 20 is configured by a mobile terminal which is used by the user (purchaser) for payment, and the information code reading device 30 is configured by a terminal placed near the POS register.

Figure 2:
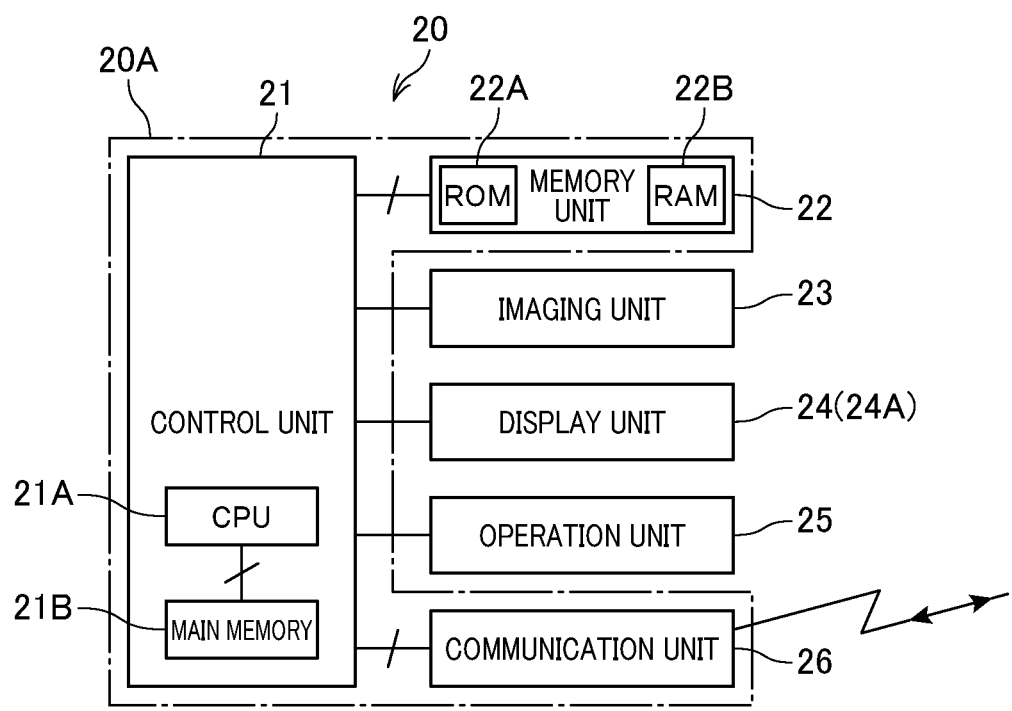
FIG. 2 is a schematic block diagram illustrating an electrical configuration of an information code display device shown in FIG. 1.

First, referring to FIG. 2, the information code display device 20 will be described.

The information code display device 20 of the present embodiment is a mobile information terminal carried by the user and used in various places to display an information code on the screen. The information code display device 20 can be configured such as by a smartphone installing an application program for displaying payment (also termed payment display application hereinafter) described later.

The information code display device 20 includes a control unit 21 including a CPU, a memory unit 22 including a semiconductor memory, such as a ROM and RAM, an imaging unit 23 configured as a camera, a touch panel display unit 24 of which the contents of display are controlled by the control unit 21, an operation unit 25 outputting an operation signal to the control unit 21 in response to touch operation or key operation for the touch panel, and a communication unit 26 communicating with external devices, such as the server 40. It should be noted that the communication unit 26 can correspond to an example of the display-side communication unit. Of these components, the control unit 21, the memory unit 22, and the communication unit 27 configure a processor 20A.

The control unit 21 is mainly configured by a computer including a CPU (central processing unit) 21A playing a central role of calculation, and a main memory 21B serving as a work area to perform various calculations and overall control of the system described later. The memory unit 22 is configured including a ROM (read only memory (e.g., EEPROM)) 22A and a RAM (random access memory) 22B and, as necessary, including known memory media, such as an HDD and a nonvolatile memory, not shown, to store in advance various application programs such as for payment display processing, predetermined databases, and the like so as to be available for the control unit 21 (i.e., CPU 21A).

In the present embodiment, the ROM 22A serves as a non-transitory computer-readable recording medium, and stores procedures for the application programs and other control/processing programs as source codes. The non-transitory computer-readable recording medium may be configured by a RAM of a type that does not lose stored information.

These programs are each read out into a preset work area 21B by the CPU 21A and executed. The RAM 22B is configured so that the data being processed by the CPU 21A can be temporarily stored therein. The main memory 21B is configured by a RAM.

As a matter of course, the configuration of the processor 21A is only an example, and thus other configurations may be used as long as the configurations can execute programs related to processing of necessary authentication and control. For example, the configurations may be that a plurality of CPUs perform decentralized control, or may be that a redundant system is incorporated therein. The CPU 21A is a component playing a central role of calculation in the computer system and thus, as a matter of course, it may be called differently (e.g., arithmetic device, processor, or microprocessor), as long as it has similar functions.

Figure 3:
FIG. 3 is a diagram illustrating an information code after being composed.

In the memory unit 22, there are prepared and stored a plurality of partial code images when installing the payment display application. The partial code images are images to be combined with each other, and are each produced removing part of cells of the code area from an image of one information code. By combining the plurality of partial code images with each other, an image of the above one information code can be produced. In the present embodiment, the memory unit 22 stores in advance, as the partial code images, partial code images P11 to P13 produced by dividing an information code C formed of a QR code (registered trademark) shown in FIG. 3 into three partial codes C11 to C13 shown in FIGS. 4(A) to 4(C), and partial code images P21 to P24 produced by dividing the information code C into four partial codes C21 to C24 shown in FIGS. 5(A) to 5(D). It should be noted that the information code C is produced so as to record thereon the personal payment information of the user carrying the information code display device 20 or terminal information with which the information code display device 20 can be specified, and other information, as predetermined information to be read. It should also be noted that the memory unit 22 in which the partial code images are stored in advance and the control unit 21 can correspond to an example of the partial code image preparation unit.

In particular, as can be seen from FIGS. 4(A) to 4(C), the partial code images P11 to P13 are produced so as to provide a match between the positions of the partial codes in these images and the positions of the code areas of the information code C. Specifically, as shown in FIG. 4(A), the partial code image P11 is produced so that, when the information code C is disposed at a reference position (e.g., center of the screen), the partial code C11 is disposed at a position that is occupied by the partial code C11 in the information code C. Furthermore, as shown in FIG. 4(B), the partial code image P12 is produced so that, when the information code C is disposed at the reference position, the partial code C12 is disposed at a position that is occupied by the partial code C12 in the information code C. Also, as shown in FIG. 4(C), the partial code image P13 is produced so that, when the information code C is disposed at the reference position, the partial code C13 is disposed at a position that is occupied by the partial code C13 in the information code C. Similarly, as can be seen from FIGS. 5(A) to 5(D), the partial code images P21 to 24 are produced so as to provide a match between the positions of the partial codes in these images and the positions of the code areas of the information code C.

Then, in the payment display processing performed by the control unit 21 (i.e., CPU 21A) with the start of the payment display application, a first rule is received from the server 40 in response to a first request, so that the partial code images are cyclically displayed on a display screen 24A (serving as a medium carrying the code) of the display unit 24 based on the first rule. 例えば、第1の規則として、For example, when a rule for cyclically displaying the partial images P11 to P13 at a first frame rate (e.g., 50 fps) has been received from the server 40 as a first rule, the partial code images P11 to P13 are cyclically displayed at this frame rate. Also, when a rule for cyclically displaying the partial images P21 to P24 at a second frame rate (e.g., 60 fps) has been received from the server 40 as a first rule, the partial code images P21 to P24 are cyclically displayed at this frame rate. Thus, in the state where the plurality of partial code images are cyclically displayed on the screen at high speed, the user or the like visually recognizes that the information code C is being displayed on the display screen.

Next, referring to FIG. 6, the information code reading device 30 will be described.

The information code reading device 30 of the present embodiment is a terminal disposed near a POS register, and can be configured by a tablet terminal or the like in which an application program for payment reading (also termed payment reading application hereinafter) is installed.

Figure 6:
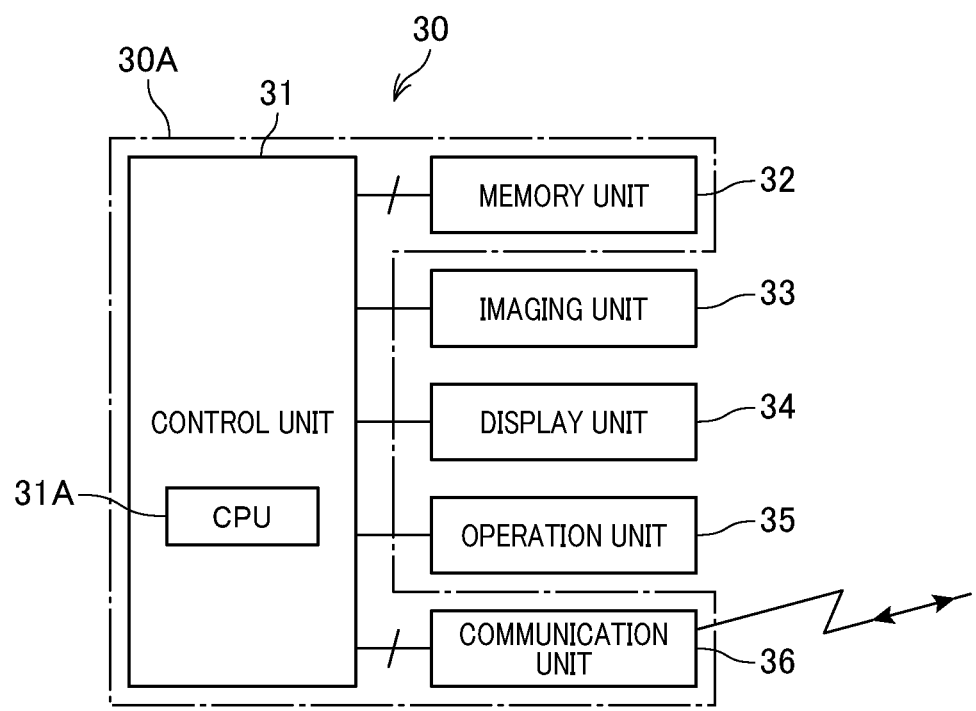
FIG. 6 is a schematic block diagram illustrating an electrical configuration of an information code reading device shown in FIG. 1.

As shown in FIG. 6, the information code reading device 30 includes a control unit 31 including a CPU 31A, a memory unit 32 including a semiconductor memory, such as a ROM 22A and RAM 22B, an imaging unit 33 configured as a camera, a touch panel display unit 34 of which the contents of display are controlled by the control unit 31 (e.g., CPU 31A), an operation unit 35 outputting an operation signal to the control unit 31 in response to touch operation or key operation for the touch panel, and a communication unit 36 communicating with external devices, such as the server 40. It should be noted that the communication unit 36 can correspond to an example of the reading-side communication unit.

Then, in the payment reading processing performed by the control unit 31 with the start of the payment reading application, images are captured by the imaging unit 33 at imaging intervals (shutter speed) according to a second rule received from the server 40 in response to a second request, and a plurality of images obtained by the imaging are combined based on the second rule to restore an information code to be read. The reading results as a result of reading the restored information code are outputted to the POS register as payment information.

Next, referring to FIG. 7, the server 40 will be described.

The server 40 is configured as a computer having a function of performing rule transmission processing in which the display conditions and the imaging conditions for the partial code images are synchronized between the information code display device 20 and the information code reading device 30.

Figure 7:
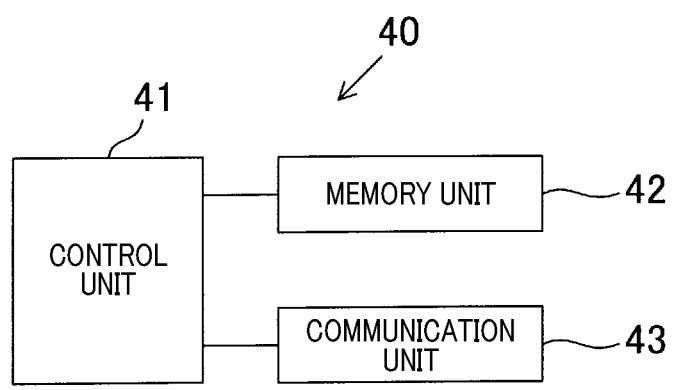
FIG. 7 is a schematic block diagram illustrating an electrical configuration of a server shown in FIG. 1.

As shown in FIG. 7, the server 40 mainly includes a control unit 41 performing overall control of the server 40, a memory unit 42, and a communication unit 43. The control unit 41 is mainly configured by a microcomputer and includes a CPU, a system bus, and an input/output interface to serve as an information processor together with the memory unit 42. The memory unit 42 includes a ROM, RAM, and HDD to store in advance an application program for executing the rule transmission processing and predetermined databases so as to be available for the control unit 41. The communication unit 43 is controlled by the control unit 41 and is configured to have a function as a communication means for communicating with other external devices, such as the information code display device 20 and the information code reading device 30, via a predetermined network N, such as the Internet. It should be noted that the communication unit 43 can correspond to an example of the server-side communication unit.

In the rule transmission processing performed by the control unit 41 of the server 40 configured as described above, a rule related to display of an information code is set according to the time of receiving a request from the information code display device 20 or the information code reading device 30, and the set rule is transmitted to the information code display device 20 or the information code reading device 30. In the present embodiment, as the rule related to display of an information code, there are prepared three parameters which are the number of segments of the information code, segmenting positions, and frame rate, so as to be selectively used. The parameters to be selected when receiving a request are ensured to be switched after the lapse of a predetermined period (e.g., 10 minutes).

Specifically, a first rule is set so that the number of segments, segmenting positions, and frame rate are selected according to the time of receiving a first request from the information code display device 20, and the set first rule is transmitted to the information code display device 20. In particular, in the present embodiment, the first rule transmitted to the information code display device 20 includes information associated with an expiration period corresponding to the above predetermined period. Thus, in the operation, the information code display device 20 again makes a first request to the server 40 after the lapse of the expiration period after receiving the first rule. Furthermore, a second rule is set so that the number of segments, segmenting positions, and imaging intervals corresponding to the frame rate (shutter speed) are selected according to the time of receiving the second request from the information code reading device 30, and the set second rule is transmitted to the information code reading device 30. Thus, if the timing of the first request and the timing of the second request are close to each other, the first rule and the second rule can be set so as to be compatible with each other.

Next, referring to the flow diagrams shown in FIGS. 8 to 10, a description will be given of the processing performed in the information code display device 20, the information code reading device 30, and the server 40 of the information code reading system 10 configured as described above. This processing is performed when the user (purchaser) carrying the information code display device 20 makes a payment at a store or the like where the information code reading device 30 is installed.

First, referring to the flow diagram shown in FIG. 8, payment display processing performed by the control unit 21 of the information code display device 20 will be described.

Figure 8:
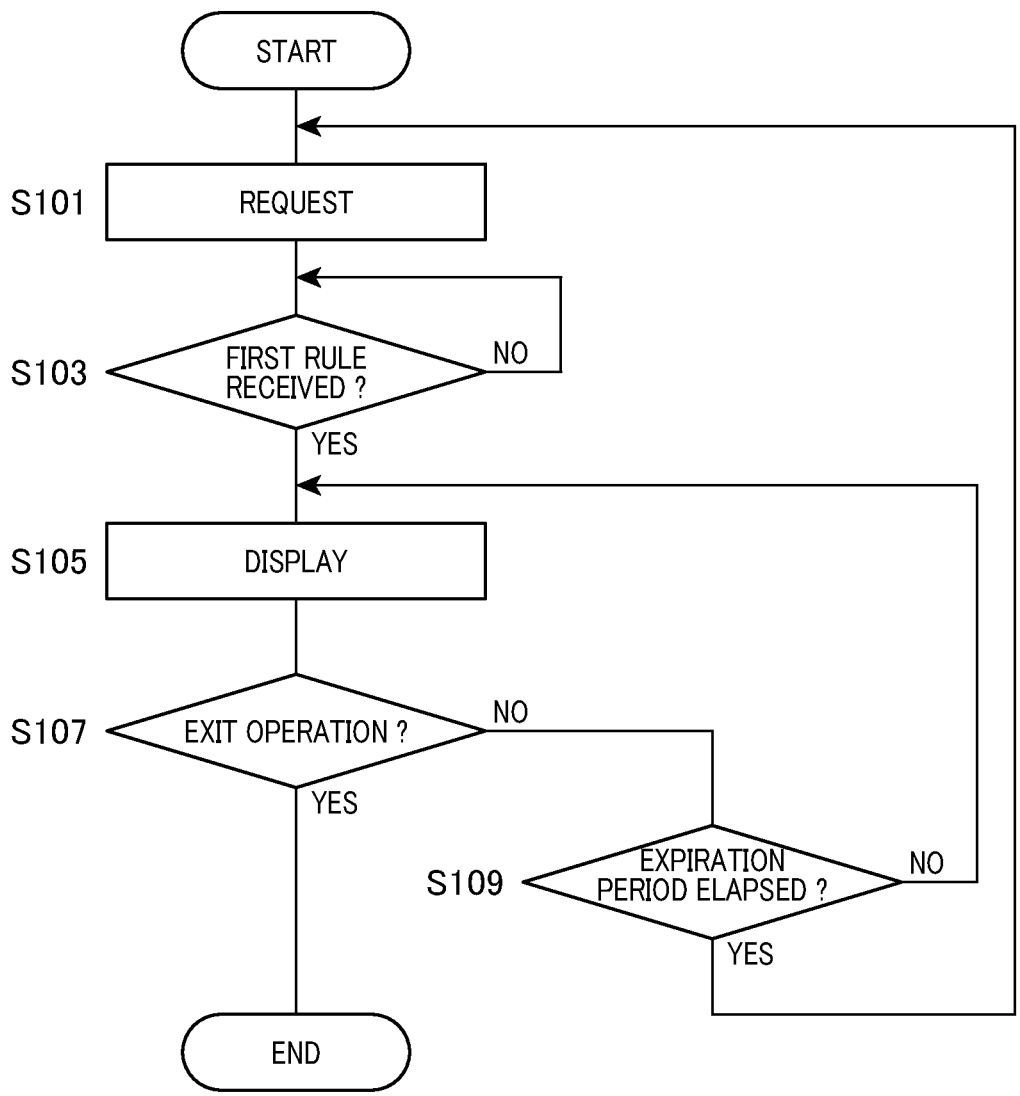
FIG. 8 is a flow diagram illustrating a flow of payment display processing performed in the information code display device according to the first embodiment.
Figure 9:
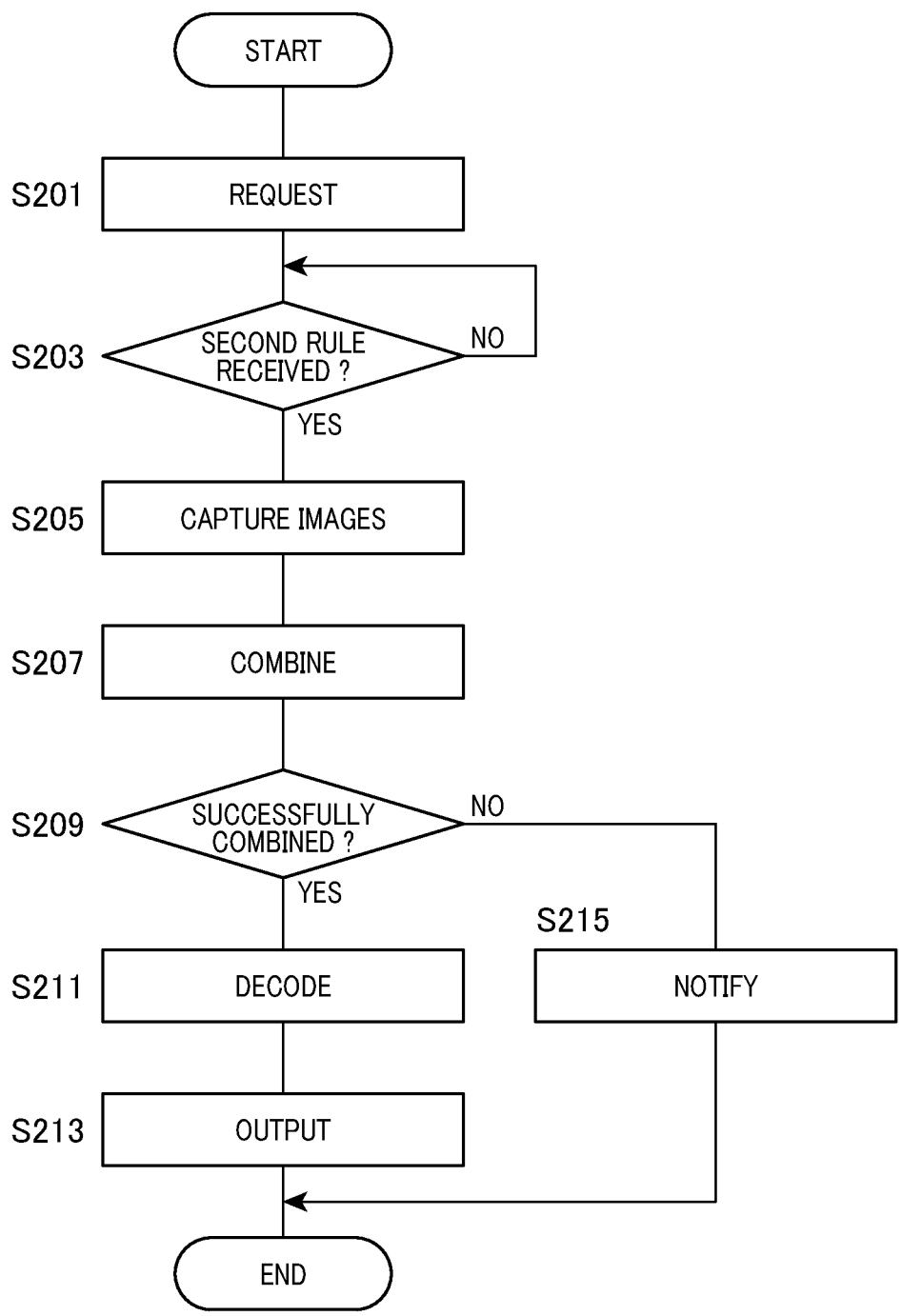
FIG. 9 is a flow diagram illustrating a flow of payment reading processing performed in the information code reading device according to the first embodiment.

When the payment display application is started in response to the user's predetermined operation to start the payment display processing, request processing indicated at step S101 of FIG. 8 is performed to make a first request to the server 40 via the communication unit 26. If a first rule is received as described above in response to the first request (Yes at step S103), display processing indicated at step S105 is performed to cyclically display partial code images on the display screen 24A (corresponding to a physical medium carrying the code) of the display unit 24, based on the first rule received.

If no exit operation is performed (No at step S107) and if the expiration period included in the first rule has not yet elapsed (No at step S109), the state in which the partial code images are cyclically displayed continues. Then, if payment has been completed and the user has performed exit operation (Yes at step S107), the present payment display processing is terminated.

On the other hand, if the expiration period has elapsed in the state in which cyclic display of the partial code images continues (Yes at step S109), the processing from step S101 is again performed to again make a first request to thereby update the first rule for commencement of a new expiration period.

Next, referring to the flow diagram of FIG. 9, payment reading processing performed by the control unit 31 of the information code reading device 30 will be described.

Payment reading processing is started when store staff or the like have started the payment reading application and performed predetermined operation for capturing images of the display screen 24A of the information code display device 20. With the start of this processing, request processing indicated at step S201 of FIG. 9 is performed to make a second request to the server 40 via the communication unit 36. If a second rule is received as described above in response to the second request (Yes at step S203), control proceeds to step S205 where imaging processing is performed to continuously perform imaging for a predetermined period at imaging intervals according to the received second rule.

Subsequently, combination processing indicated at step S207 is performed to compose one information code from the plurality of images captured as mentioned above, based on the second rule. If this combination processing is successfully performed (Yes at step S209) and one information code has been acquired, control proceeds to decoding processing indicated at step S211 to decode the single information code. Then, outputting processing indicated at step S213 is performed to output the results of reading performed as mentioned above into the POS register as payment information, and then the present payment reading processing is terminated. It should be noted that the control unit 31 performing the processing of step S207 can correspond to an example of the combination unit, and the control unit 31 performing the processing of step S211 can correspond to an example of the decoding unit.

On the other hand, if no single information code that can be decoded is acquired, e.g., if all the images captured show the same information code, combination processing is determined to be unsuccessful (No at step S209), and then control proceeds to step S215 where notification processing is performed. In this processing, the fact that no payment can be made due to no authentic information code being imaged is notified using display or the like of the display unit 34, and then the present payment reading processing is terminated. In the notification processing, the notification does not necessarily have to be visually provided, but may be, for example, audibly provided using an alarm, beep or the like to notify the fact that no payment can be made due to no authentic information code having been imaged.

Next, referring to the flow diagram shown in FIG. 10, rule transmission processing performed by the control unit 41 of the server 40 will be described.

Figure 10:
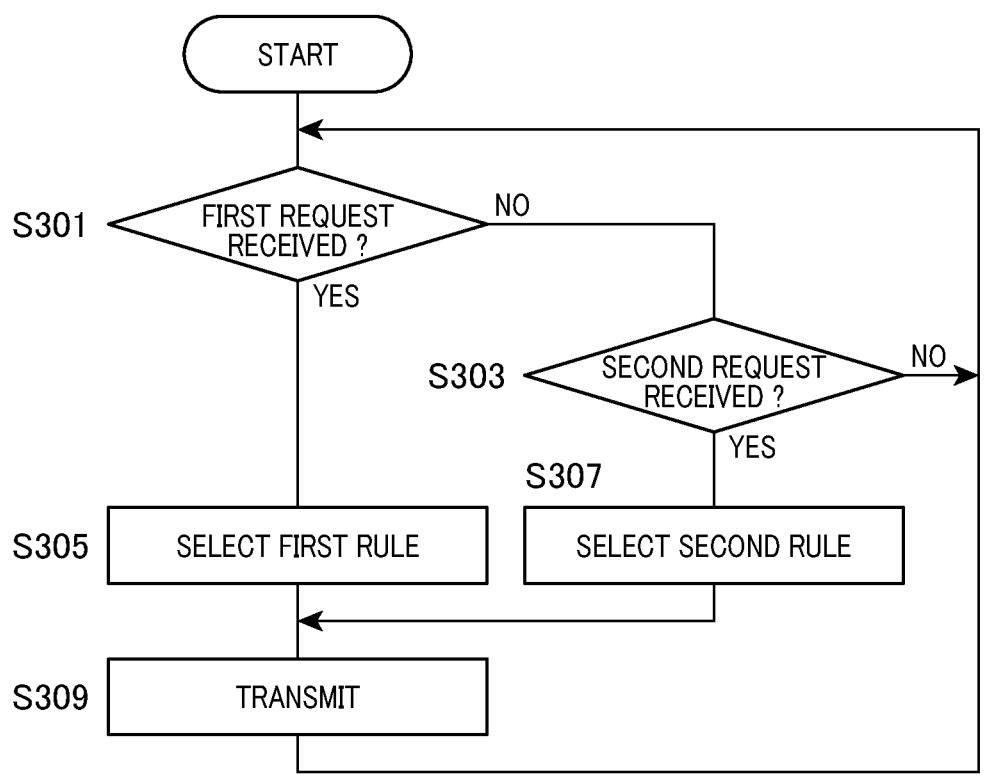
FIG. 10 is a flow diagram illustrating a flow of rule transmission processing performed in the server according to the first embodiment.

When the rule transmission processing is started by the control unit 41, determination processing of steps S301 and S303 of FIG. 10 is performed to determine whether either of a first request and a second request has been received. If neither of the first and second requests has been received, a No determination is repeatedly made in the determination processing of steps S301 and S303.

Then, if a first request is received from the information code display device 20 (Yes at step S301), control proceeds to step S305 where first rule selection processing is performed. In this processing, a suitable number of segments, suitable segmenting positions, and a suitable frame rate are selected according to the time of receiving the first request, from among several data for the number of segments, segmenting positions, and frame rate prepared in advance. The number of segments, segmenting positions, and frame rate selected in this way are transmitted to the information code display device 20 as a first rule, together with information related to expiration period (step S309).

Furthermore, if a second request is received from the information code reading device 30 (Yes at step S303), control proceeds to step S307 where second rule selection processing is performed. In this processing, a suitable number of segments, suitable segmenting positions, and a suitable imaging interval are selected according to the time of receiving the second request, from among several data for the number of segments, segmenting positions, and imaging intervals (shutter speed) prepared in advance. The number of segments, segmenting positions, and imaging intervals selected in this way are transmitted to the information code reading device 30 as a second rule (step S309). It should be noted that the control unit 41 performing the processing of steps S305 and S307 can correspond to an example of the setting unit that sets rules related to display of partial code images according to the time of receiving the requests.

For example, the control unit 40 may receive a first request from the information code display device 20 and, at this reception time, may select the number of segments and segmenting positions for obtaining three segments, i.e., upper, middle and lower segments, in FIGS. 4(A) to 4(C), and a frame rate of 50 fps. Then, a first rule according to the results of the selection may be transmitted to the information code display device 20. In this case, if the control unit 40 receives a second request at around this time from the information code reading device 30, the control unit 40 may select the number of segments and segmenting positions for providing three segments, i.e., upper, middle and lower segments, and imaging intervals (shutter speed) corresponding to the frame rate of 50 fps to transmit a second rule according to the results of the selection to the information code reading device 30.

Thus, in the information code display device 20, the partial code images P11 to P13 are cyclically displayed on the display screen 24A of the display unit 24 at the frame rate of 50 fps, while in the information code reading device 30, the display screen 24A is imaged at the imaging intervals corresponding to the frame rate of 50 fps according to the received second rule to capture the partial code images P11 to P13 in this order. Thus, in the combination processing of step S207, the information code C shown in FIG. 3 can be decodably composed from the captured partial code images C11 to C13 because the positions of the three partial codes C11 to C13 are obtained from the second rule.

Furthermore, for example, the control unit 40 may select the number of segments and segmenting positions for providing four segments shown in FIGS. 5(A) to 5(D), and a frame rate of 60 fps, at the time of receiving a first request from the information code display device 20 to transmit a first rule according to the results of the selection to the information code display device 20. In this case, if the control unit 40 receives a second request at around this time from the information code reading device 30, the control unit 40 may select the number of segments and segmenting positions for providing the four segments mentioned above, and imaging interval (shutter speed) corresponding to the frame rate 60 of fps to transmit a second rule according to the results of the selection to the information code reading device 30.

Thus, in the information code display device 20, the partial code images P21 to P24 are cyclically displayed on the display screen 24A of the display unit 24 at the frame rate of 60 fps, while in the information code reading device 30, the display screen 24A is imaged at the imaging intervals corresponding to the frame rate of 60 fps, according to the received second rule to capture the partial code images P21 to P24 in this order. Thus, the information code C shown in FIG. 3 can be decodably composed from the captured partial code images C21 to C24 in the combination processing of step S207 because the positions of the four partial codes C21 to C24 are obtained from the second rule. It should be noted that the displays shown in FIG. 5 and the subsequent figures each include a display screen as in the display shown in FIG. 4. These displays, although not shown, are similarly referred to as the display screen 24A.

As described above, in the information code reading system 10 of the present embodiment, when a first rule is received in the information code display device 20 from the server 40 in response to a first request to the server 40, a plurality of partial code images are cyclically displayed on the display screen 24A of the display unit 24 based on the first rule. Then, when a second rule is received in the information code reading device 30 from the server 40 in response to a second request to the server 40, images of the display screen 24A are captured at imaging intervals according to the second rule to decode the information code C composed from the captured plurality of images based on the second rule. The server 40 is ensured to set a rule related to display of the partial code images according to the time of receiving a request. Thus, if a first request is received from the information code display device 20, a set rule is transmitted to the information code display device 20 as a first rule according to the time of receiving the first request. Also, if a second request is received from the information code reading device 30, a set rule is transmitted to the information code reading device 30 as a second rule according to the time of receiving the second request.

Thus, in the case where the information code reading device 30 captures images of the display screen of the information code display device 20 at the imaging intervals according to the second rule that has been received from the server 40 in response to the second request, the information code display device 20 is in the act of cyclically displaying the partial code images, which have been prepared to meet the first rule received from the server 40, according to the first rule. Accordingly, if the timing of the first request is close to the timing of the second request, the first and second rules are set so that the rules are compatible with each other. Therefore, the information code reading device 30 can sequentially capture images of the partial code images cyclically displayed on the information code display device 20 without fail. The information code reading device 30 can easily keep track of how images of the partial code images are captured based on the second rule, and thus can decodably compose one information code from the partial code images. In other words, the information code reading device 30 can read one information code by capturing images of the display screen on which the partial code images are cyclically displayed by the information code display device 20. On the other hand, even if the display screen of the information code display device 20 is simply imaged, only an image of one partial code image can be captured. Therefore, no image of an information code on which predetermined information is recorded can be captured, and thus the information code can be prevented from being replicated. Furthermore, even if the display screen of the information code display device 20 is imaged multiple times, not all of the partial code images can be imaged unless a second rule received at the imaging timing is used. Therefore, no single information code can be decodably composed. This can prevent unauthorized use (replication) of the displayed information code.

In particular, in the present embodiment, the first rule includes information related to an expiration period, and after the lapse of the expiration period included in the first rule (Yes at step S109), a first rule is newly requested to the server 40 in the payment display processing performed by the control unit 21. Thus, the information code display device 20 can update the first rule at appropriate timing according to the expiration period included in the first rule.

It should be noted that a partial code image is not limited to being prepared including one of three or four segments of an information code C, but may be prepared including one of five or more segments of the information code C.

Furthermore, a partial code image is not limited to being prepared including one of a plurality of segments of an information code C, but may be prepared omitting part of the cells forming a code area of the information code C from the image of the information code C. For example, as in partial code images P31 to P33 shown in FIGS. 11(A) to 11(C), partial codes C31 to C33 may be prepared by thinning out cells from the information code C in the range of disabling error correction. In particular, each partial code image may be produced by leaving specific patterns therein, such as the finder patterns of a QR code, and removing part of the cells from the remaining data recording area portions. Thus, since all the partial code images similarly include specific patterns, use of the specific patterns as references for combination can quicken reading of an information code composed.

Second Embodiment

Referring to the drawings, an information code reading system according to a second embodiment will be described.

The second embodiment is mainly different from the first embodiment in that the first rule can be changed if the display conditions following the first rule are unacceptable. Accordingly, the same reference signs are designated to the components which are substantially the same as those of the first embodiment to omit repeated explanation.

In the payment display processing performed in the information code display device 20, display conditions following the received first rule may be unacceptable, depending on the display performance and the like of the information code display device 20. For example, if a high frame rate is specified, the partial code images cannot be necessarily cyclically displayed at this high frame rate.

In this regard, in the present embodiment, if display conditions following the first rule received by the information code display device 20 are unacceptable, a display condition code is produced as an information code for the information code reading device 30 to read, so that the information code reading device 30 can request the server 40 to change the first rule and the second rule. In this case, in the display condition code, there are recorded information related to display conditions that are acceptable to the display unit 24 (also termed acceptable display information hereinafter), and specific information that can specify the information code display device 20.

Figure 12:
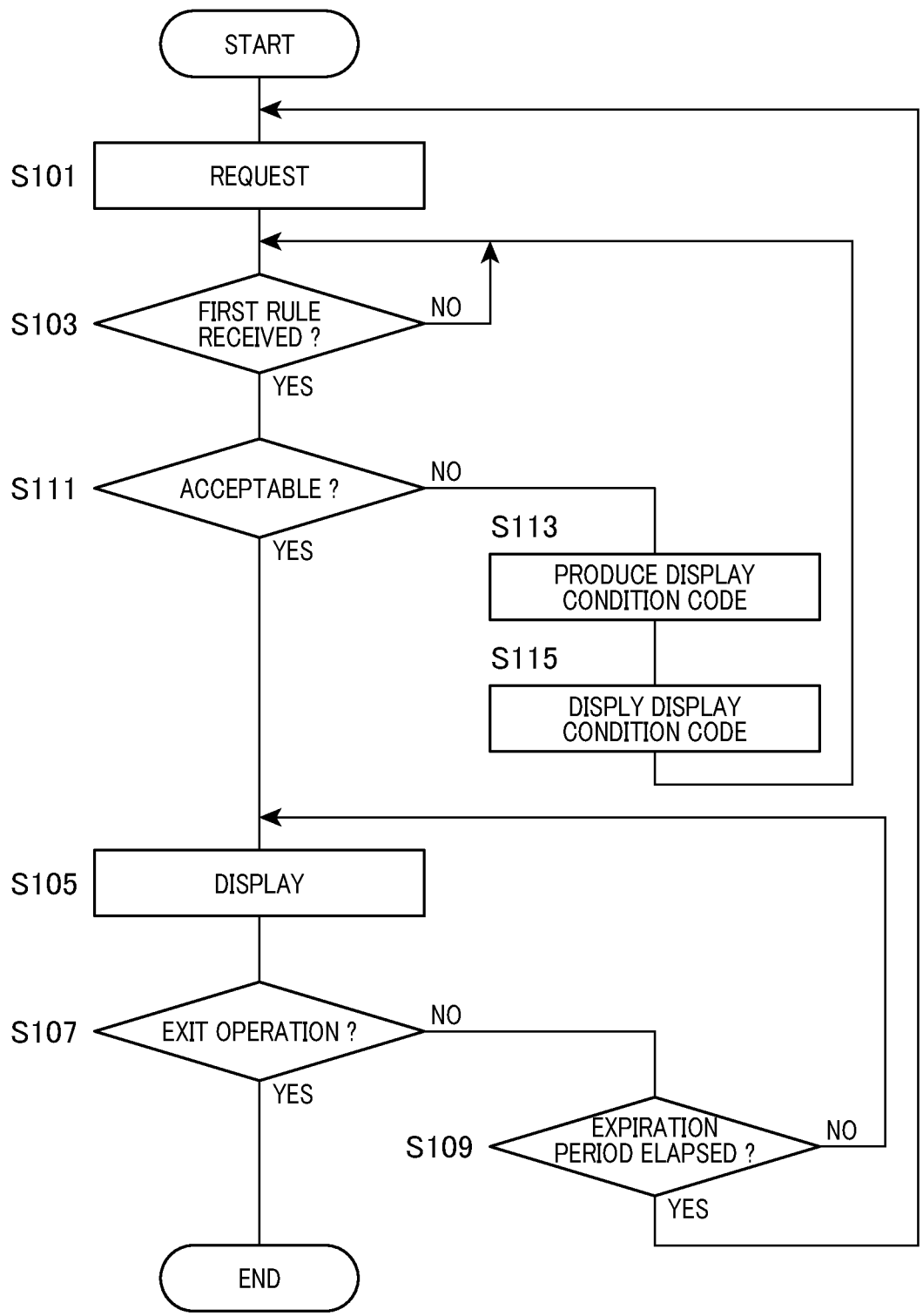
FIG. 12 is a flow diagram illustrating a flow of payment display processing performed in an information code display device according to a second embodiment.
Figure 13:
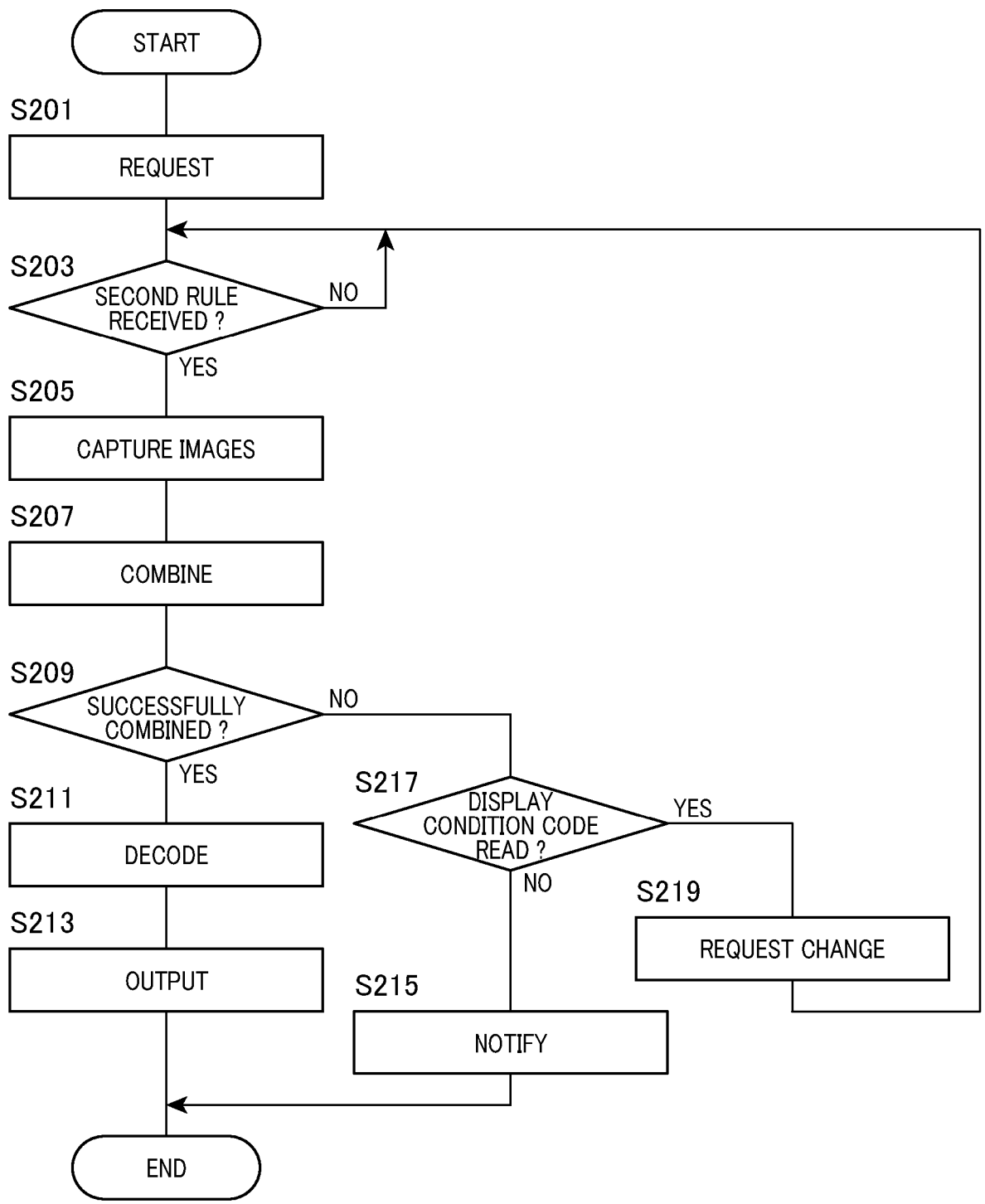
FIG. 13 is a flow diagram illustrating a flow of payment reading processing performed in an information code reading device according to the second embodiment.
Figure 14:
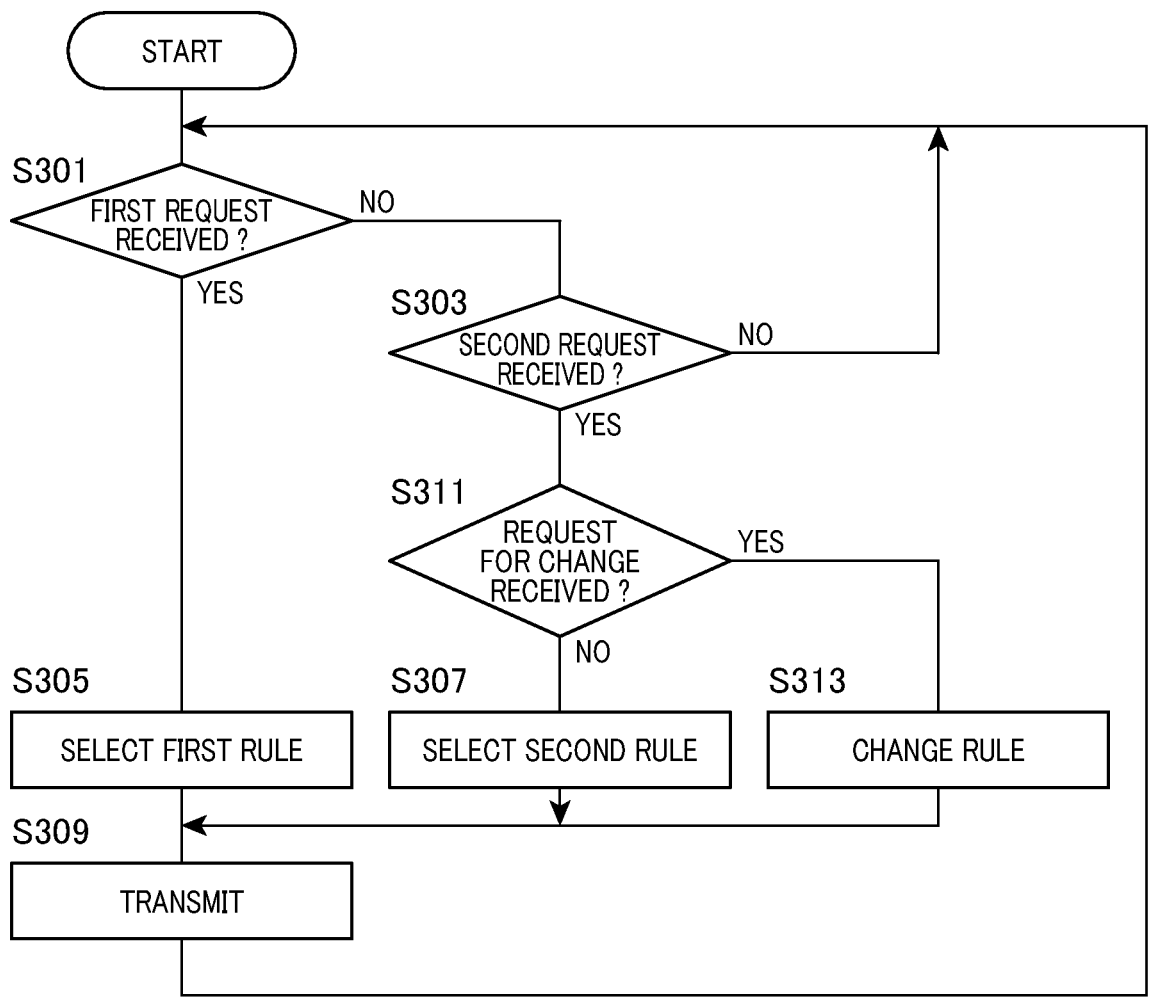
FIG. 14 is a flow diagram illustrating a flow of rule transmission processing performed in a server according to the second embodiment.

Referring now to the flow diagrams shown in FIGS. 12 to 14, a detailed description will be given of the processing performed by the information code display device 20, the information code reading device 30, and the server 40.

In the payment display processing performed by the control unit 21 of the information code display device 20, when a first rule is received from the server 40 in response to a first request (Yes at step S103 of FIG. 12), control proceeds to step S111 where determination processing is performed to determine whether the received display conditions following the first rule are acceptable. If the display conditions following the first rule are acceptable (Yes at step S111), processing of step S105 onward is performed. It should be noted that the control unit 21 that performs the determination processing of step S111 can correspond to an example of the determination unit.

If the display conditions following the first rule are not acceptable, a No determination is made at step S111 and control proceeds to step S113 where display condition code production processing is performed. In this processing, a display condition code is produced to record thereon the above acceptable display information (e.g., information indicating that a frame rate of 30 fps or less is an acceptable display condition) and the specific information. Subsequently, control proceeds to step S115 where display condition code displaying processing is performed to display the display condition code, which is in a stationary state and produced as mentioned above, on the display unit 24. Then, the determination processing of step S103 is performed and the display condition code is continued to be displayed until a first rule is newly received. It should be noted that the control unit 21 that performs the processing of step S113 can correspond to an example of the production unit.

In the payment reading processing performed by the control unit 31 of the information code reading device 30, when a second rule is received from the server 40 in response to a second request (Yes at step S203 of FIG. 13), the control unit 31 performs processing for composing one information code based on the second rule, from a plurality of images captured thereafter (step S207).

In this case, if the display condition code displayed on the display unit 24 is being imaged, one information code that can be decodable cannot be produced by combining the images, and thus it is determined that the combination processing was unsuccessful (No at step S209). Then, control proceeds to step S217 where determination processing is performed to determine whether a display condition code has been read. If the display condition code displayed on the display unit 24 as described above has been imaged, the acceptable display information and the specific information recorded on the display condition code are decoded. Therefore, a Yes determination is made at step S217 and control proceeds to step S219 where request for change processing is performed. In this processing, a second request including the read acceptable display information and specific information is transmitted to the server 40 as a request for change.

In the rule transmission processing performed by the control unit 41 of the server 40, when a second request is received (Yes at step S303 of FIG. 14) and the second request is a request for change including acceptable display information and specific information (Yes at step S311), control proceeds to step S313 where rule change processing is performed. In this processing, irrespective of the time of receiving the request for change, a first rule is set according to the acceptable display information included in the request for change and, at the same time, a second rule is also set to meet the first rule. For example, if the received acceptable display information indicates that a frame rate of 30 fps or less is an acceptable display condition, a first rule is set according to this display condition so as to be acceptable. Thus, when a first rule and a second rule are set, control proceeds to step S309 where transmission processing is performed to transmit the first rule to the information code display device 20 which has been specified from the specific information included in the request for change, and transmit the second rule to the information code reading device 30 that has requested change.

Accordingly, in the information code display device 20 that has newly received a first rule after transmission of the request for change, the display conditions following the first rule as received become acceptable (Yes at step S111). Thus, processing of step S105 onward is performed, so that partial code images can be cyclically displayed on the display screen 24A of the display unit 24 based on the newly received first rule.

On the other hand, in the information code reading device 30 that has newly received a second rule after transmission of the request for change, images of the partial code images can be captured at the imaging intervals according to the newly received second rule because the partial code images are being cyclically displayed on the display unit 24 of the information code display device 20 as described above. Accordingly, one information code can be decodably composed from the partial code images.

As described above, in the information code reading system 10 of the present embodiment, when a first rule is received by the information code display device 20 and if the display conditions following the first rule are determined not to be display conditions that are acceptable to the display unit (No at step S111), a display condition code on which acceptable display information and specific information are recorded is produced (step S113) and displayed on the display screen 24A of the display unit 24 (step S115). Then, in the information code reading device 30, when the display condition code is decoded (Yes at step S217), a second request including the results of decoding the display condition code is made as a request for change (step S219). Then, in the server 40, when a second request including the results of decoding the display condition code is received from the information code reading device 30 (Yes at step S311), a first request and a second request are set to change display conditions according to the results of decoding (step S313), and first and second requests are respectively transmitted to the information code display device 20 and the information code reding device 30 (step S309).

Thus, in the information code display device 20, if the display conditions following the received first rule are the display conditions that are unacceptable, the display condition code is continued to be displayed. Thus, by imaging and decoding this display condition code by the information code reading device 30, the first rule and the second rule are changed so as to meet the display conditions that are acceptable by the information code display device 20. Thus, even when display conditions that are not suitable for the display performance of the information code display device 20 are instructed from the server 40 using the first rule as received, the display conditions can be appropriately changed, and in addition to that, the information code reading device 30 can receive a second rule according to the changed display conditions.

Third Embodiment

Referring to the drawings, an information code reading system according to a third embodiment will be described.

The third embodiment is mainly different from the first embodiment in that a plurality of information codes are cyclically displayed instead of partial codes. Accordingly, the same reference signs are designated to the components which are substantially the same as those of the first embodiment to omit repeated explanation.

The information code display device 20 of the present embodiment cyclically displays a plurality of types of information codes on the display screen 24A of the display unit 24 based on a first rule received from the server 40 in response to a first request. Therefore, there are prepared in advance, for example, three code images respectively including information codes to cyclically display three types of information codes, four code images respectively including information codes to cyclically display four types of information codes, and other images, and these images are stored in the memory unit 22. The information codes, which are a series of information codes, are decoded, and from the results of the decoding, there are acquired personal payment information of the user carrying the information code display device 20, terminal information that can specify the information code display device 20, and other information. Thus, these pieces of information are produced so that secret information cannot be read from one information code.

Then, the information code reading device 30 captures images of the display screen at imaging intervals according to a second rule received from the server 40 in response to a second request, and performs decoding processing for the plurality of serial images captured in this way to decode the information code. If these decoding results match the results estimated from the second rule, it is determined that a regular information code is being read, and if they are different from the results estimated from the second rule, predetermined notification is given to prevent unauthorized use of the information code.

The server 40 sets a rule related to display of information codes according to the time of receiving a request from the information code display device 20 or the information code reading device 30, and transmits the set rule to the information coed display device 20 or the information code reading device 30. In the present embodiment, two parameters, i.e., the number of information codes to be displayed, that is, the number of information codes to be cyclically displayed, and frame rate, are selectably prepared for the rule related to display of an information code.

Referring to the flow diagrams shown in FIGS. 15 to 17, a detailed description will be given of the processing performed in the information code display device 20, the information code reading device 30, and the server 40 of the present embodiment.

First, referring to the flow diagram shown in FIG. 15, payment display processing performed by the control unit 21 of the information code display device 20 will be described.

Figure 15:
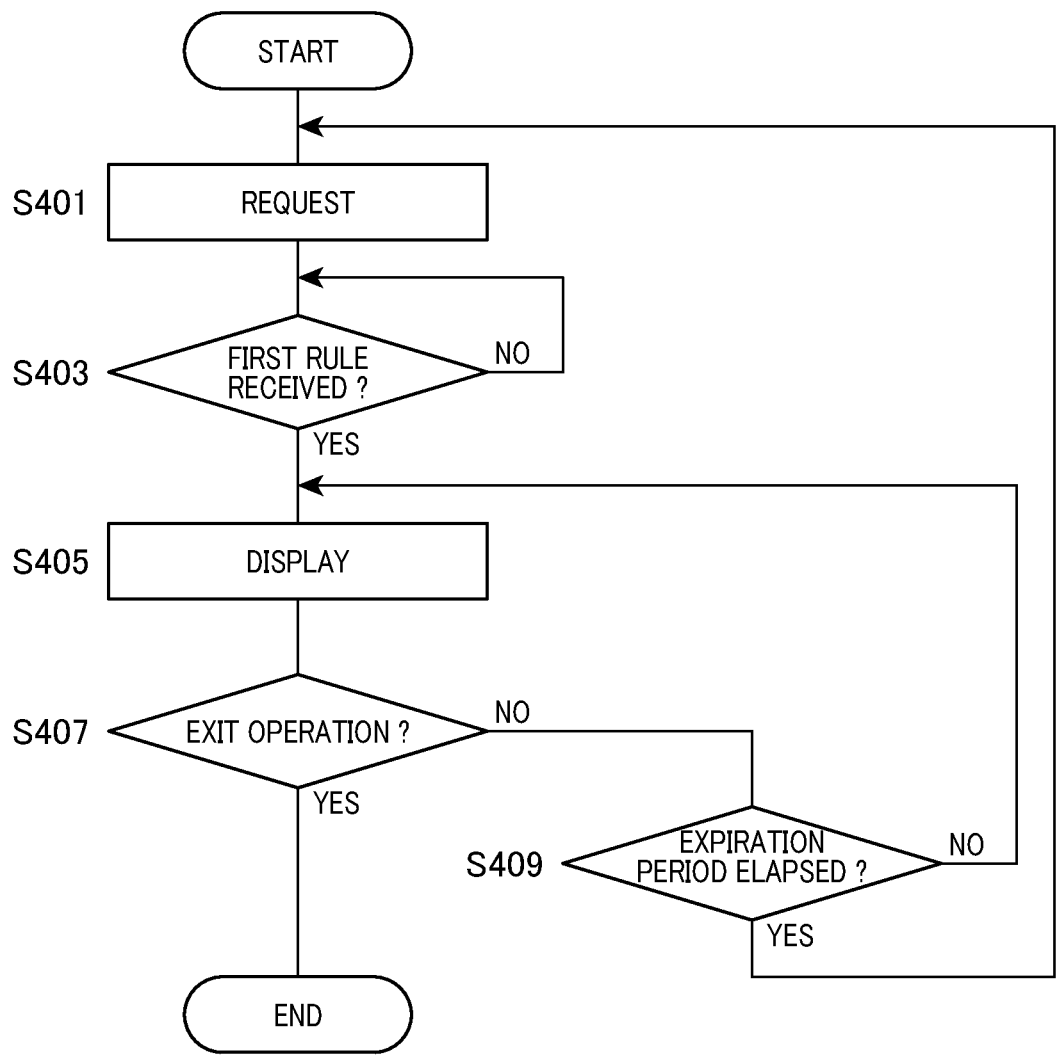
FIG. 15 is a flow diagram illustrating a flow of payment display processing performed in an information code display device according to a third embodiment.
Figure 16:
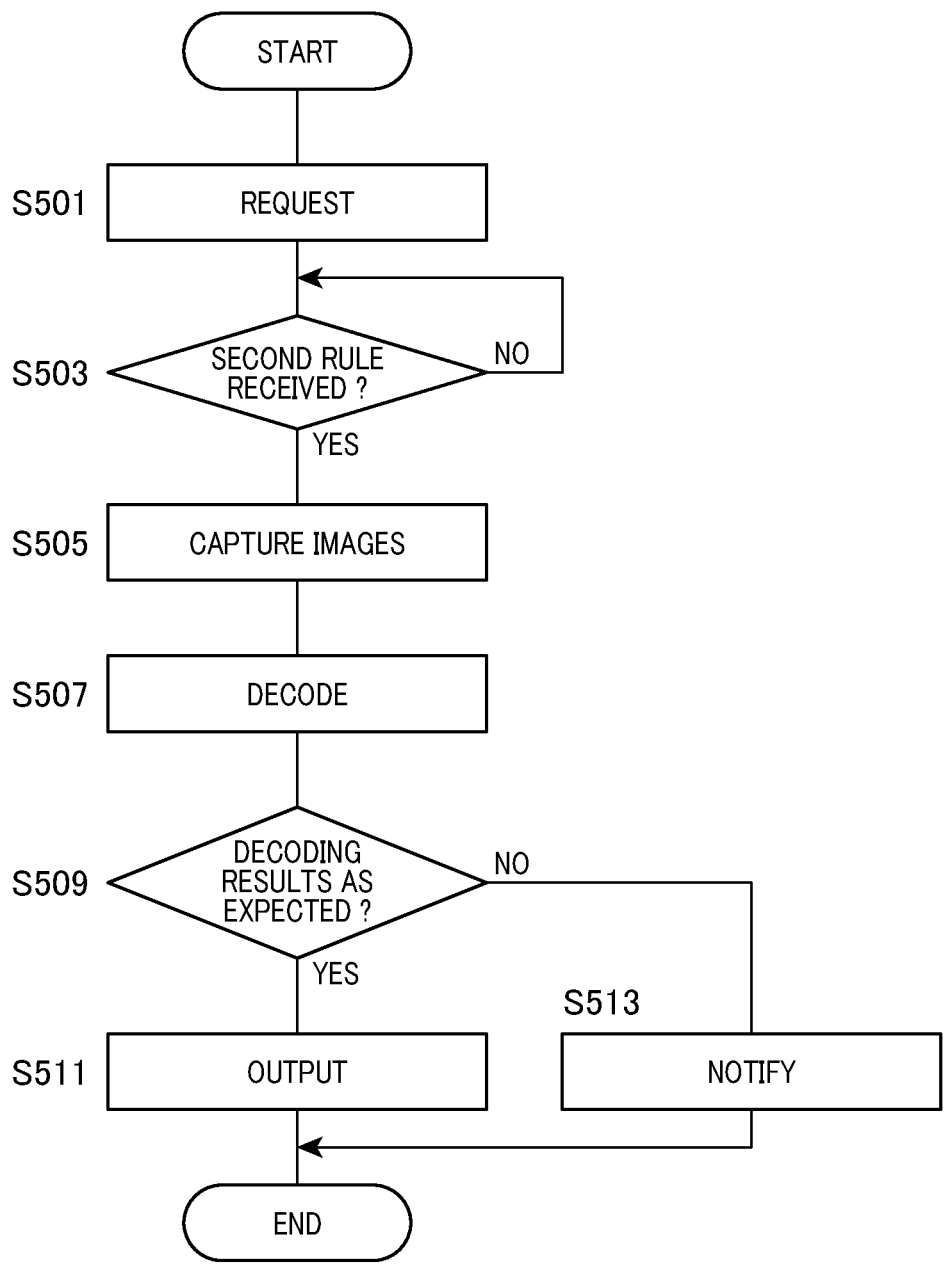
FIG. 16 is a flow diagram illustrating a flow of payment reading processing performed in an information code reading device according to the third embodiment.

When payment display processing is started by starting the above payment display application in response to the user's predetermined operation, request processing is performed at step S401 of FIG. 15 to make a first request to the server 40 via the communication unit 26. If a first rule is received as described above in response to the first request (Yes at step S403), control proceeds to step S405 where display processing is performed to cyclically display the code images stored in the memory unit 22 on the display screen 24A of the display unit 24 based on the received first rule.

Then, if no exit operation is performed (No at step S407) and if the expiration period included in the first rule has not elapsed (No at step S409), the state of cyclically displaying the code images is continued. Then, if exit operation is performed by the user after completing payment (Yes at step S407), the present payment display processing is terminated.

On the other hand, if the expiration period elapses while the state of cyclically displaying the code images continues (Yes at step S409), processing is again performed from step S401 to again make a first request and update the first rule for commencement of a new expiration period.

Next, referring to the flow diagram shown in FIG. 16, payment reading processing performed by the control unit 31 of the information code reading device 30 will be described.

Payment reading processing is started when store staff or the like has started the payment reading application and performed predetermined operation for capturing images of the display screen 24A of the information code display device 20. With the start of this processing, request processing indicated at step S501 of FIG. 16 is performed to make a second request to the server 40 via the communication unit 36. If a second rule is received as described above in response to the second request (Yes at step S503), control proceeds to step S505 where imaging processing is performed to continuously perform imaging for a predetermined period at imaging intervals according to the received second rule.

Subsequently, control proceeds to step S507 where decoding processing is performed to decode each of the information codes for the plurality of images captured as described above. Then, control proceeds to step S509 where determination processing is performed to determine whether the results of the decoding are as estimated from the second rule. In this case, if the number of displayed information codes is set to n in the second rule and if n decoding results are repeatedly obtained from the captured images, it is determined that the decoding results are as estimated from the second rule and thus a Yes determination is made at step S509. Then, control proceeds to step S511 where output processing is performed to output the n decoding results that have been read as mentioned above into the POS register as payment information and then the present payment reading processing is terminated. In the POS register or the like, personal payment information, terminal information, ang the like can be acquired from the n decoding results. It should be noted that the control unit 31 performing the processing of step S507 can correspond to an example of the decoding unit.

On the other hand, if the number of displaying information codes is set to n in the second rule and if no n decoding results are repeatedly obtained from the captured images, e.g., if all the decoding results are the same, it is determined that the decoding results are not as estimated from the second rule (No at step S509). Then, control proceeds to step S513 where notification processing is performed. In this processing, the fact that no payment can be made due to no regular information code being imaged is notified using display or the like of the display unit 34, and then the present payment reading processing is terminated. In the notification processing, the notification does not necessarily have to be visually provided, but may be, for example, audibly provided using an alarm, beep or the like to notify the fact that no payment can be made due to no regular information code being imaged. The display unit 34 and other components can correspond to an example of the notification unit.

Next, referring to the flow diagram shown in FIG. 17, rule transmission processing performed by the control unit 41 of the server 40 will be described.

Figure 17:
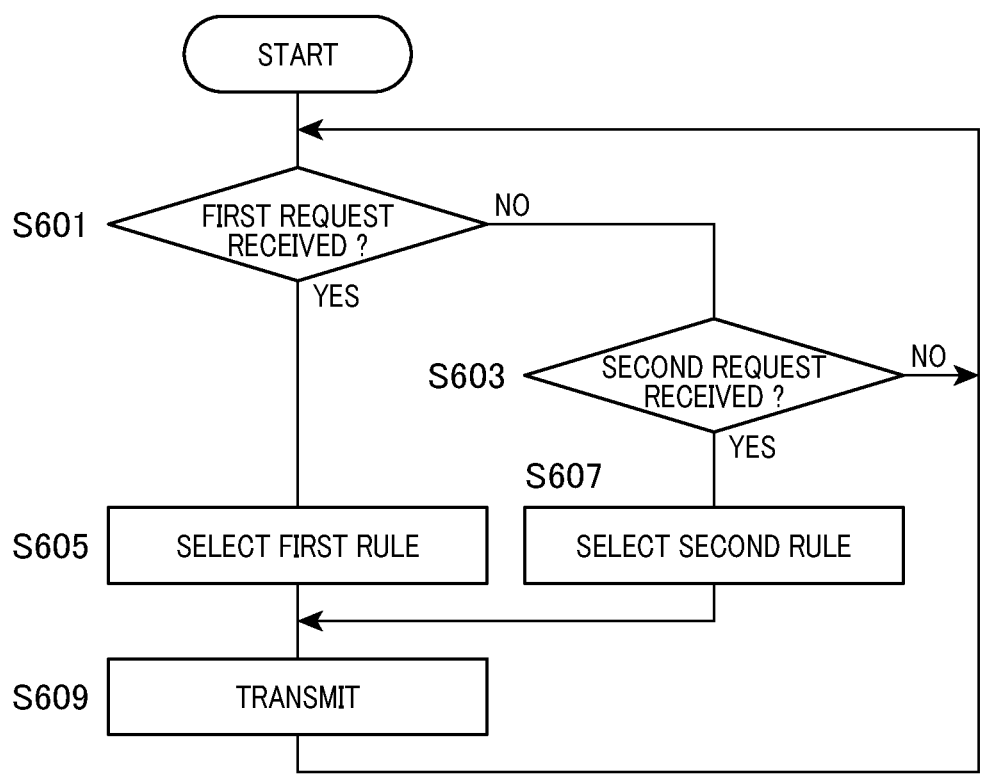
FIG. 17 is a flow diagram illustrating a flow of rule transmission processing performed in a server according to the third embodiment.

When the rule transmission processing is started by the control unit 41, determination processing of steps S601 and S603 of FIG. 17 is performed to determine whether either of a first request and a second request has been received. If neither of the first and second requests has been received, a No determination is repeatedly made in the determination processing of steps S601 and S603.

Then, if a first request is received from the information code display device 20 (Yes at step S601), control proceeds to step S605 where first rule selection processing is performed. In this processing, a suitable number of displaying information codes and a frame rate are selected according to the time of receiving the first request, from among several items of data for the number of displaying information codes and frame rate prepared in advance. The number of displaying information codes and the frame rate selected in this way are transmitted to the information code display device 20 as a first rule, together with information related to expiration period (step S609).

Furthermore, if a second request is received from the information code reading device 30 (Yes at step S603), control proceeds to step S607 where second rule selection processing is performed. In this processing, a suitable number of displaying information codes and imaging intervals are selected according to the time of receiving the second request, from among several data for the number of displaying information codes and imaging intervals (shutter speed) prepared in advance. The number of displaying information codes and the imaging intervals selected in this way are transmitted to the information reading device 30 as a second rule (step S609). It should be noted that the control unit 41 performing the processing of step S605 and the processing of step S607 can correspond to an example of the setting unit that sets rules related to display of information codes according to the time of receiving requests.

As described above, in the information code reading system 10 of the present embodiment, when the information code display device 20 receives a first rule from the server 40 in response to a first request to the server 40, a plurality of information codes stored in the memory unit 22 are cyclically displayed on the display screen 24A of the display unit 24 according to the first rule. Then, when the information code reading device 30 receives a second rule from the server 40 in response to a second request to the server 40, images of the display screen are captured at imaging intervals according to the second rule to perform decoding processing in which each information code is decoded for the plurality of serial images captured in this way. If the decoding results are different from those which are estimated from the second rule (No at step S509), predetermined notification is performed (step S513). The server 40 is ensured to set a rule related to display of information codes according to the time of receiving a request. Specifically, the server 40 sets and transmits a rule, as a first rule, to the information code display device 20 in response to a first request received from the information code display device 20, according to the time of receiving the first request, and also sets and transmits a rule, as the second rule, to the information code reading device 30 in response to a second request received from the information code reading device 30, according to the time of receiving the second request.

Thus, in the case where the information code reading device 30 captures images of the display screen 24A of the information code display device 20 at imaging intervals according to the second rule received from the server 40 in response to the second request, the information code display device 20 cyclically displays the plurality of information codes on the display screen 24A to meet the first rule received from the server. Thus, if the timing of making the first request is close to the timing of making the second request, the first and second rules are set so as to be compatible with each other. Accordingly, the information code reading device 30 can sequentially capture images of all the cyclically displayed information codes without fail. On the other hand, if the results of the sequential decoding are different from those which are estimated from the second rule, e.g., in the situation where three decoding results are expected to be obtained because three information codes are cyclically displayed according to the second rule, and if the three decoding results are the same, the information code reading device 30 can determine that another information code or the like different from that on the display screen 24A of the information code display device 20 is being imaged, and can perform predetermined notification. In other words, if another information code or the like different from that displayed on the display screen 24A of the information code display device 20 is being imaged, the predetermined notification can be performed to prevent unauthorized use of the information code displayed on the screen.

In the third embodiment, as in the second embodiment, if the display conditions following the first rule are not display conditions that are acceptable, the rule may be changed. Specifically, when the information code display device 20 receives a first rule and if the display conditions following the first rule are determined not to be display conditions that are acceptable to the display unit, a display condition code, on which acceptable display information and specific information are recorded, may be produced and displayed on the display screen 24A of the display unit 24. Then, after decoding the display condition code, the information code reading device 30 may make a second request, as a request for change, including the decoding results of the display condition code. Then, when the second request including the decoding results of the display condition code is received from the information code reading device 30, the server 40 may set a first rule and a second rule to change the display conditions according to the decoding results, and may respectively transmit the rules to the information code display device 20 and the information code reading device 30. Thus, even when display conditions that do not meet the display performance of the information code display device 20 are instructed from the server 40 through the first rule as received, the display conditions can be appropriately changed, and in addition to that, the information code reading device 30 can receive a second rule according to the changed display conditions.

Fourth Embodiment

Next, referring to the drawings, an information code reading system according to a fourth embodiment will be described.

The fourth embodiment is mainly different from the first embodiment in that the server 40 has been omitted, the frame rate of cyclical display in the information code display device is constant, and images are captured by the information code reading device at imaging intervals (shutter speed) conforming to the predetermined constant frame rate. Accordingly, the same reference signs are designated to the components which are substantially the same as those of the first embodiment to omit repeated explanation.

Figure 18:
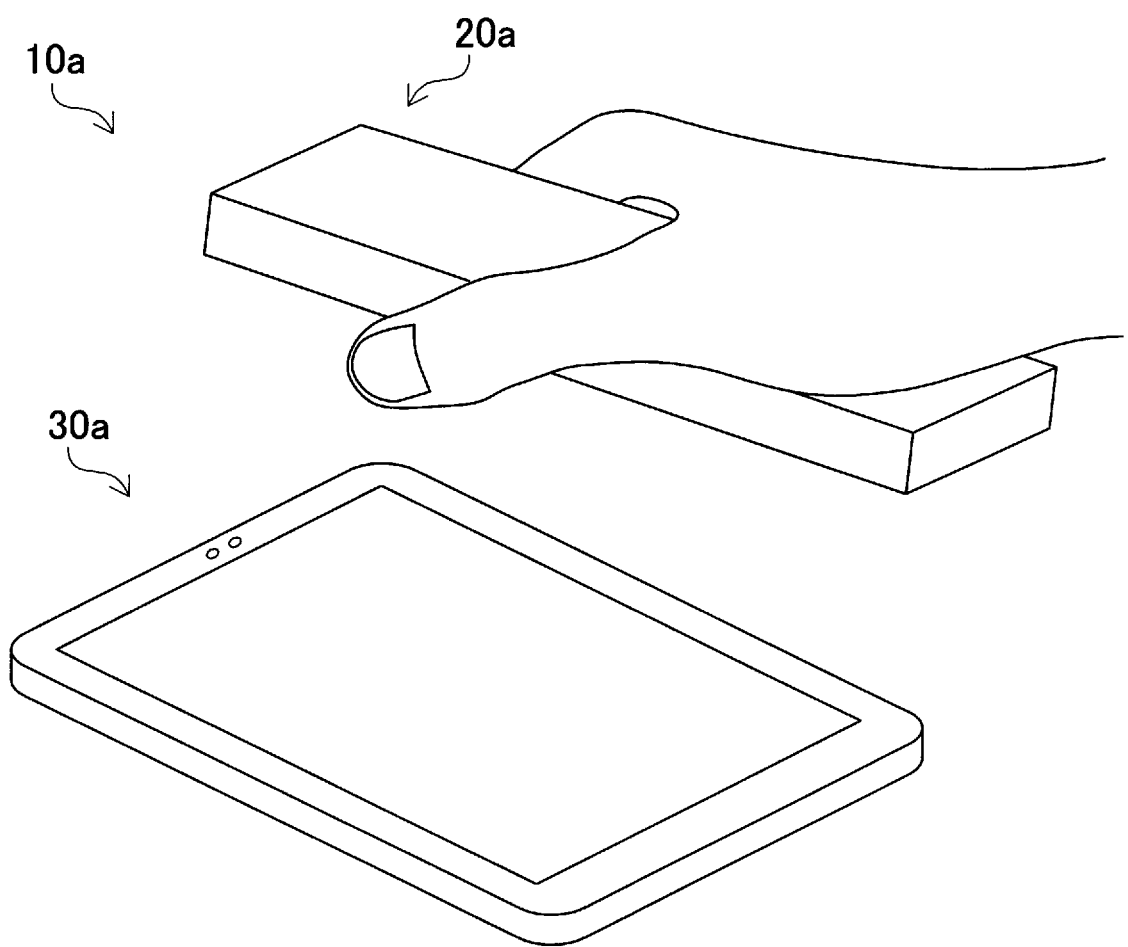
FIG. 18 is a schematic diagram illustrating a configuration of an information code reading system according to a fourth embodiment.

Similarly to the information code reading system 10, an information code reading system 10a according to the present embodiment serves as a system for preventing unauthorized use, such as replication, of an information code displayed on a screen. As shown in FIG. 18, the information code reading system 10a is configured to include an information code display device 20a and an information code reading device 30a respectively having functions equivalent to those of the information code display device 20 and the information code reading device 30 of the information code reading system 10 described above, omitting the server 40.

In the information code display device 20a of the present embodiment, when an application program for displaying payment (also termed second payment display application hereinafter) used in the present embodiment is installed, a plurality of combination code images are prepared and stored in the memory unit 22. Each combination code image is produced with part of the cells replaced according to a predetermined rule, based on an information code on which predetermined information is recorded using light color-based cells and dark color-based cells arranged in a code area (also termed original code hereinafter). A plurality of combination code images are prepared by changing positions of replacement cell areas which are target of replacement. Thus, an image of the original code can be produced by combining the combination code images according to the predetermined rule. It should be noted that the predetermined information may include personal payment information of the user carrying the information code display device 20a, terminal information that can specify the information code display device 20a, and other information.

In the present embodiment, the predetermined rule is set for a data recording area of a code area except for specific patterns, such as finder patterns, so that correct codewords recorded on respective data blocks (each formed of eight cells) forming the data recording area of an original code are distributed in units of data blocks. In particular, the predetermined rule is set for the data blocks located at the same positions in a plurality of types of combination code images, so that one of the combination code images will include a cell arrangement that is the same as that of the code area, and that the remaining combination code images will include replacement cell areas.

Figure 19:
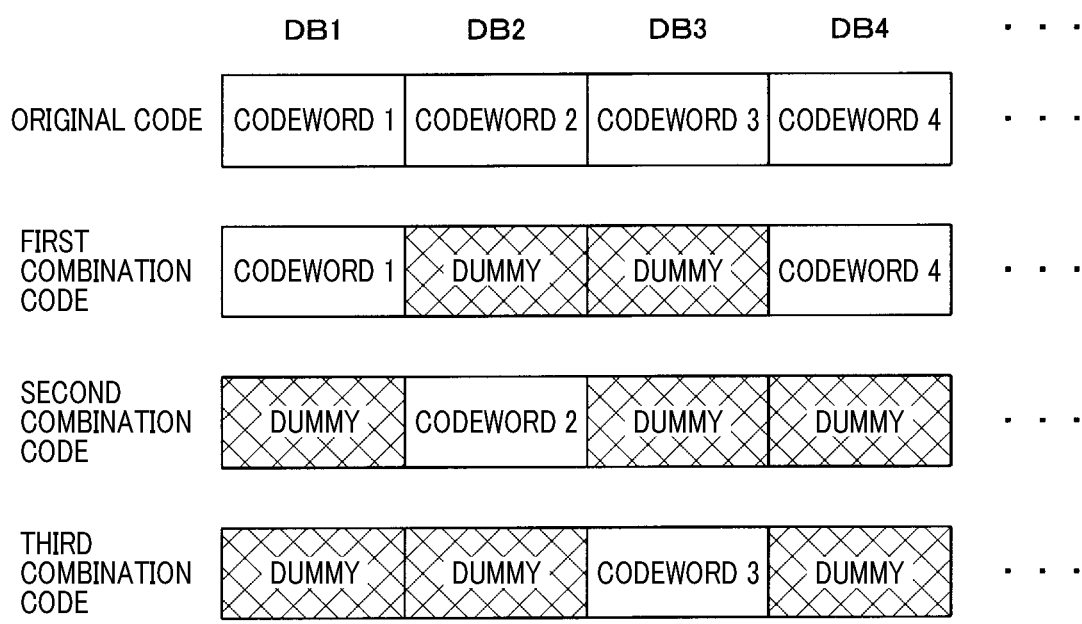
FIG. 19 is a diagram illustrating a relationship between correct codewords and dummy cells which configure each combination code according to the fourth embodiment.

Specifically, for example, if three combination code images are prepared, as shown in FIG. 19, a first combination code may be produced so that correct codewords are recorded on a $(3k+1)^{st}$ data block, such as a first data block DB1 (see FIG. 22(A)) or a fourth data block DB4, and dummy cells are arranged in other data blocks as replacement cell areas.

Also, a second combination code may be produced so that correct codewords are recorded on a $(3k+2)^{nd}$ data block, such as a second data block DB2 (see FIG. 22(B)) or a fifth data block, and dummy cells are arranged in other data blocks as replacement cell areas. Furthermore, a third combination code may be produced so that correct codewords are recorded on a $(3k+3)^{rd}$ data block, such as a third data block DB3 (see FIG. 22(C)) or a sixth data block, and dummy cells are arranged in other data blocks as replacement cell areas.

In the present embodiment, the dummy cells arranged in the first, second and third combination codes are set with the same code size and cell size as those of a predetermined cell pattern having a QR code arrangement, so as to have cell arrangements of the data blocks located at the same positions. The present embodiment uses, for example, a checkered pattern shown in FIG. 20 as the predetermined cell pattern; however, without being limited to this, for example, a pattern that can assist reading, such as a mask pattern used for QR codes, may be used. Furthermore, for example, the dummy cells may all be formed of light color-based cells, or may all be formed of dark color-based cells. It should be noted that in FIG. 20 and in FIG. 22 and other figures referred to later, the dark color-based cells forming dummy cells are cross hatched for the sake of convenience.

Figure 21:
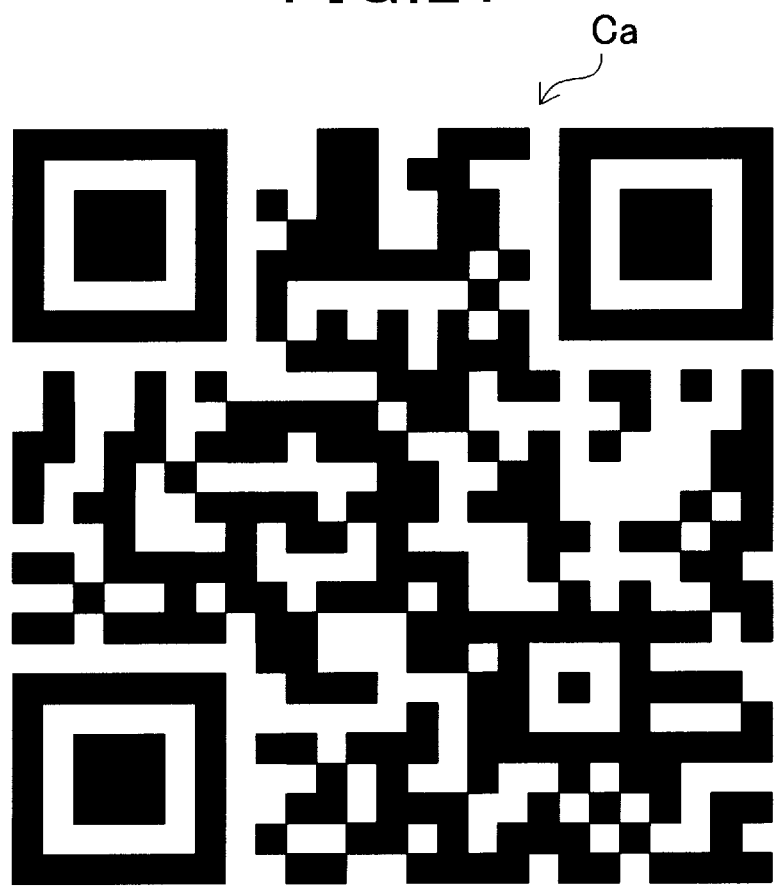
FIG. 21 is a diagram illustrating an original code.

Accordingly, for example, three combination codes C41 to C43 as shown in FIGS. 22(A) to 22(C) are produced based on the predetermined rule, from an original code Ca shown in FIG. 21 formed of a QR code, to prepare in advance combination code images P41 to P43 for the respective combination codes, for storage in the memory unit 22. In particular, as can be seen from FIGS. 22(A) to 22(C), the combination code images P41 to P43 are produced so that the positions of the code areas match each other. It should be noted that the memory unit 22 that stores combination code images in advance to prepare the combination code images, and the control unit 21 can correspond to an example of the code image preparation unit.

Then, in second payment display processing performed by the control unit 21 by starting the second payment display application, the combination code images P41 to P43 are cyclically displayed on the display screen 24A of the display unit 24 at a predetermined specified frame rate.

Then, in payment reading processing performed by the control unit 31 of the information code reading device 30a of the present embodiment, images are captured by the imaging unit 33 at predetermined imaging intervals corresponding to the specified frame rate. The captured combination code images are subjected to combination processing in which these images are combined with each other based on the predetermined rule to restore an information code to be read. In the present embodiment, information related to the predetermined rule is stored in advance in the memory unit 32 of the information code reading device 30a.

Thus, when images of the display screen 24A, on which the combination code images P41 to P43 are being cyclically displayed at the specified frame rate, are being captured at the predetermined imaging intervals, the combination processing is performed based on the predetermined rule, using the 3 k+1$^{st}$ data block of the first combination code C41 of the combination code image P41, the 3 k+2$^{nd}$ data block of the second combination code C42 of the combination code image P42, and the 3 k+3$^{rd}$ data block of the third combination code C43 of the combination code image P43 to compose the original code Ca.

The original code Ca composed in this way is decoded by performing decoding processing to read the predetermined information recorded on the original code Ca. It should be noted that the control unit 31 performing the combination processing can correspond to an example of the combination unit, and the control unit 31 performing the decoding processing can correspond to an example of the decoding unit.

As described above, in the information code display device 20a of the information code reading system 10a of the present embodiment, a plurality of types combination code images (P41 to P43) are prepared according to the predetermined rule, with part of cells replaced, by changing positions of the replacement cell areas as targets of replacement, based on the information code (Ca) on which predetermined information is recorded using light color-based cells and dark color-based cells arranged in the code area. The plurality of types of combination code images prepared in this way are cyclically displayed on the display screen 24A of the display unit 24. Then, in the information code reading device 30a, images of the display screen are captured at the predetermined imaging intervals, and one information code produced based on the predetermined rule by combining the plurality of captured images is decoded through decoding processing.

Thus, the information code reading device 30a can decodably compose one information code from cells, which are not targets of replacement, of the combination code images, based on the predetermined rule. In other words, the information code reading device 30a can read one information code by capturing images of the display screen of the information code display device 20a on which the combination code images are cyclically displayed. On the other hand, even when the display screen of the information code display device 20a is simply imaged, only an image of one combination code image can be captured without capturing an image of an information code on which predetermined information is recorded, and thus replication of the information code can be prevented. Furthermore, even when images of all the combination code images are captured by capturing an image of the display screen of the information code display device 20a multiple times, the information code on which predetermined information is recorded cannot be decodably composed, unless the predetermined rule is used. Accordingly, unauthorized use (replication) of the information code displayed on the screen can be prevented.

Figure 20:
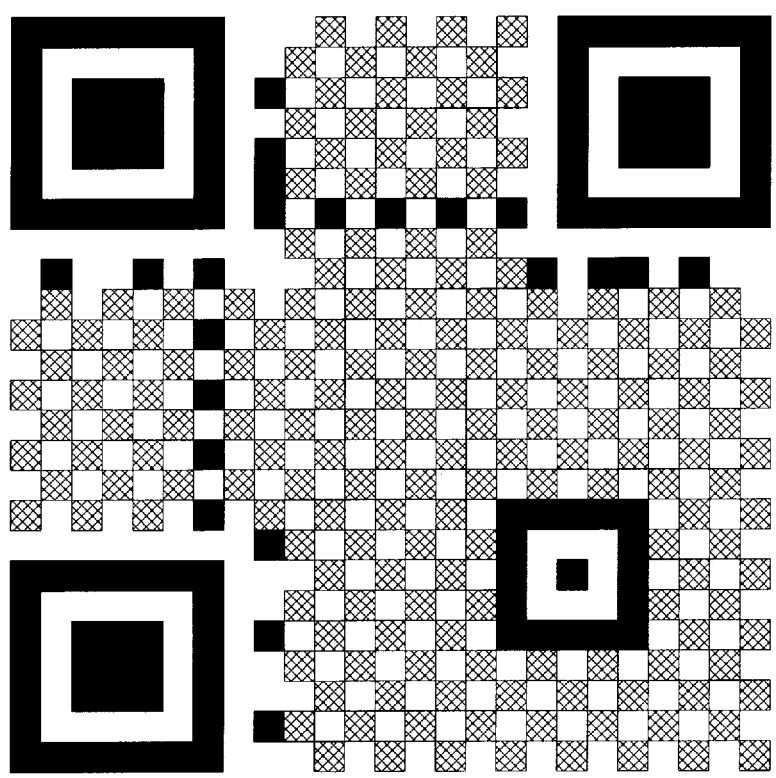
FIG. 20 is a diagram illustrating an example of a predetermined cell pattern configuring a dummy cell.

As in the checkered pattern shown in FIG. 20, the dummy cells in other data blocks forming replacement areas form part of the predetermined cell pattern corresponding to the code area. Thus, for example, the outline of each combination code image is prevented from becoming indistinct, which would otherwise occur due to the replacement cell areas being formed of only white cells.

Also, in the information code on which predetermined information is recorded, part of the code area is formed by arranging a plurality of data blocks each formed of a predetermined number of cells, while, as can be seen from FIG. 19, the replacement cell areas are set in units of data blocks. The predetermined rule is set for the data blocks located at the same positions in a plurality of types of combination code images, so that one of the combination code images will include a cell arrangement that is the same as that of the code area, and that the remaining combination code images will include replacement cell areas.

Thus, each replacement cell area in the combination code images is set in units of data blocks, and thus the replacement cell areas that are not necessary for combination can be easily distinguished from the cell areas necessary for combination, thereby reducing processing load during the combination processing.

As a modification of the present embodiment, combination code images may be produced so as to individually include information related to the predetermined rule, such as information indicating the order of the image. For example, as in combination codes C51 to C53 in combination code images P51 to P53 shown in FIGS. 23(A) to 23(C), information related to the predetermined rule, such as information indicating the the order of the image, may be individually recorded on an area Cf which corresponds to a format information area of a QR code having an error correction function, so that an original code can be more accurately composed. In particular, with this configuration, the information code reading device 30a is not required to acquire the information related to the predetermined rule in advance. Thus, since the predetermined rule can be changed for each information code, security can be improved, while enhancing convenience of the system.

In a modification of the present embodiment, the number of the combination code images cyclically displayed on the screen is not limited to three, but two combination code images, or four or more combination code images may be cyclically displayed on the screen. Also, the replacement cell areas are not limited to being set in units of data blocks, but may be set in arbitrary regions that can be specified from the predetermined rule.

Fifth Embodiment

Referring to the drawings, an information code reading system according to a fifth embodiment will be described.

The fifth embodiment is mainly different from the fourth embodiment in that determination code images are cyclically displayed on the display screen of the display unit, in addition to a plurality of types of combination code images. Accordingly, the same reference signs designate the components which are substantially the same as those of the fourth embodiment to omit repeated explanation.

In the present embodiment, as can be seen from FIG. 24, a determination code, on which a parity value (determination information) is recorded, is produced for each data block to determine whether the cell arrangement is the same as that of the code area. An image of this determination code is added to the plurality of types of the combination code images and cyclically displayed on the display screen of the display unit.

For example, a value obtained by adding 1 to the number of dark color-based cells forming a data block may be used as a parity value corresponding to the data block to produce a determination code. In this case, in a data block formed of four dark color-based cells and four light color-based cells, the parity value is set to 5. Thus, after composing an original code, for each data block, a value obtained by adding 1 to the number of dark color-based cells forming the data block is compared with the parity value read from the determination code corresponding the data block. If there is no match between these two values, the data block can have a high probability of being erroneously read.

Thus, in the present embodiment, using the parity value (determination information) read from an imaged determination code, the composed original code can be determined for each data block as to whether the data block has been correctly composed. Therefore, for example, the data block in which the two values are determined not to be the same is not used for error correction to enhance the error correction performance, and thus readability can be improved.

Sixth Embodiment

Next, referring to the drawings, an information code reading system according to a sixth embodiment will be described.

The sixth embodiment is mainly different from the fourth embodiment in that a plurality of types of combination code images respectively produced from a plurality of original codes are cyclically displayed on the display screen of the display unit. Accordingly, the same reference signs are designated to the components which are substantially the same as those of the fourth embodiment to omit repeated explanation.

In the information code display device 20a of the present embodiment, a plurality of types of first combination code images are prepared from a first information code image on which first information is recorded. In the plurality of types of first combination code images, part of cell areas forming a code area of the first information code are individually replaced to meet the predetermined rule. At the same time, a plurality of types of second combination code images are prepared from a second information code image on which second information is recorded. In the plurality of types of second combination code images, part of cell areas forming a code area of the second information code are individually replaced to meet the predetermined rule. The plurality of types of first combination code images and the plurality of types of second combination code images prepared in this way are cyclically displayed on the display screen of the display unit 24. Then, in the information code reading device 30a, a first information code and a second information code are composed from a plurality of images captured by the imaging unit 33, based on the predetermined rule.

Figure 25:
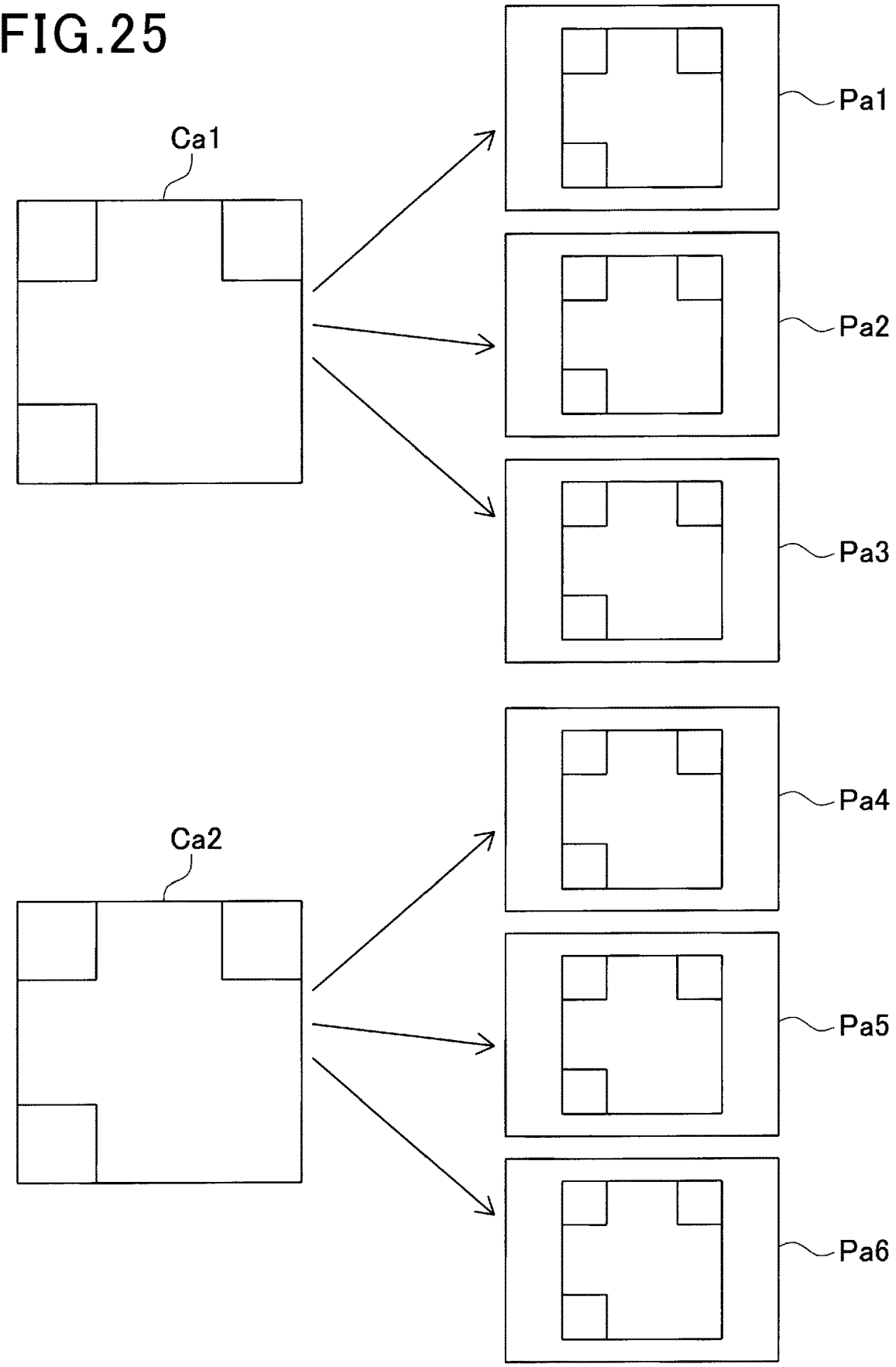
FIG. 25 is a diagram illustrating a principal part of an information code reading system according to a sixth embodiment.

For example, as shown in FIG. 25, in the case where there are prepared three combination code images Pa1 to Pa3 which are produced from a first original code Ca1, and three combination code images Pa4 to Pa6 which are produced from a second original code Ca2, six combination code images Pa1 to Pa6 are cyclically displayed on the display screen of the display unit 24. Therefore, the information code reading device 30a can compose the first original code Ca1 and the second original code Ca2 from a plurality of images captured by the imaging unit 33, based on the predetermined rule, and can read the first information and the second information respectively from the first original code Ca1 and the second original code Ca2.

In this way, the information code reading device 30a can capture the combination code images cyclically displayed on the display screen of the display unit 24 to read two pieces of information (first information and second information). Thus, the amount of readable information can be increased, while preventing unauthorized use (replication) of the information code displayed on the screen.

The number of original codes (Ca1, Ca2) from which a plurality of types of combination code images (Pa1 to Pa6) are produced and cyclically displayed on the display screen of the display unit 24 is not limited to two, but a plurality of types of combination code images may be produced respectively from three or more original codes and cyclically displayed on the display screen of the display unit 24. In this case, the information code reading device 30a can read pieces of information from three or more original codes, and thus the amount of readable information can be further increased.

Seventh Embodiment

Referring to the drawings, an information code reading system according to a seventh embodiment will be described.

The seventh embodiment is different from the fourth embodiment in that a plurality of combination code images are produced so that, for cells located at the same positions in a predetermined combination area targeted to cell replacement in the code area, light and darkness obtained from the light and darkness of the cells of the plurality of types of combination code images and a predetermined rule match the light and darkness of the cells of the original code. Accordingly, the same reference signs are designated to the components which are substantially the same as those of the fourth embodiment to omit repeated explanation.

In the present embodiment, the data recording area is set in the predetermined combination area targeted to cell replacement, and combination code images are produced so that, in this predetermined combination area, light or darkness obtained from the light or darkness of the cells in the combination code images and a predetermined rule match the light and darkness of the cells of the original code.

Specifically, in the present embodiment, using a QR code shown in FIG. 26(A) as an original code Cb, combination code images P61 to P63 of three combination codes C61 to C63 having the same code size and the same cell size are prepared as shown in FIGS. 27(A) to 27(C) according to the predetermined rule. In the example shown in FIGS. 27(A) to 27(C), the predetermined rule adopted is that when the number of combination codes with light color-based cells is compared with the number of combination codes with dark color-based cells, for cells located at the same positions in the combination codes, the light and darkness of the cells of the original code should match the light and darkness of the cells whichever the number is greater.

Therefore, at the cell positions where the cells of the original code Cb are based on light color, two or all the combination codes have light color-based cells, and at the cell positions where the cells of the original code Cb are based on dark color, two or all the combination codes have dark color-based cells. In FIG. 26(B), cells of the original code Cb which become light color-based cells in all the combination codes are indicated with white cells, and cells of the original code Cb which become light color-based cells in two combination codes and become dark color-based cells in the remaining one combination code are indicated with hatching. Furthermore, cells of the original code Cb which become dark color-based cells in two combination codes and become light color-based cells in the remaining one combination code are indicated with cross hatching, and cells of the original code Cb which become dark color-based cells in all the combination codes are indicated with black cells.

Thus, in the information code display device 20*a*, combination codes (C61 to C63) are produced based on the predetermined rule, and combination code images (P61 to P63) are prepared in advance for the respective combination codes, for storage in the memory unit 22. Then, in the second payment display processing performed by the control unit 21 with the start of the second payment display application, the combination code images (P61 to P63) are cyclically displayed on the display screen of the display unit 24 at a predetermined specified frame rate.

Then, in the payment reading processing performed by the control unit 31 of the information reading device 30*a* of the present embodiment, images are captured by the imaging unit 33 at predetermined imaging intervals corresponding to the specified frame rate, and an information code to be read is restored by performing combination processing in which the combination code images captured are combined according to the predetermined rule. It should be noted that, in the present embodiment, information related to the predetermined rule is stored in advance in the memory unit 32 of the information code reading device 30*a*.

Accordingly, while images of the display screen, on which the combination code images P61 to P63 are being cyclically displayed at the specified frame rate, are captured at the predetermined imaging intervals, the combination processing is performed according to the predetermined rule, so that cells at positions where they become light color-based cells in two or more combination codes become light color-based cells, and cells at positions where they become dark color-based cells in two or more combination codes become dark color-based cells to thereby compose an original code Cb.

As described above, in the information code reading system 10*a* of the present embodiment, a plurality of types of combination code images (P61 to P63) are produced so that, for cells located at the same positions in a predetermined combination area targeted to cell replacement in the code area, light and darkness obtained from the light and darkness of the cells of the plurality of types of combination code images and the predetermined rule match the light and darkness of the cells of the original code (Cb).

Thus, the information code reading device 30*a* can decodably compose the information code, based on the light and darkness of the cells in the predetermined combination area in the combination code images, and the predetermined rule. On the other hand, even if images of all the combination code images are captured by capturing images of the display screen of the information code display device 20*a* multiple times, the information code on which the predetermined information is recorded cannot be decodably composed unless the predetermined rule is used. Therefore, unauthorized use (replication) of the information code displayed on the screen can be prevented.

The predetermined rule is not limited to being set so as to simply use the majority rule for the number of cells, as described above, but may be set, for example, so as to use logical OR (OR) or exclusive OR (XOR) relating to light and darkness of the cells located at the same positions in the combination codes, or may be set to use the results of logical OR of part of the combination codes and exclusive OR of the remaining combination codes. Furthermore, the predetermined combination area targeted to cell replacement is not limited to being set so as to be present in the data recording area, but may be set so as to be present in part of the data recording area. In this case, combination codes are produced so that cells located outside the predetermined combination area will all have the same light and darkness array.

As a modification of the present embodiment, as shown in FIGS. 28(A) to 28(D), the information code display device 20*a* may cyclically display an image P64 of a different information code Cc on which information related to the predetermined rule is recorded, on the display screen of the display unit 24, in addition to the plurality of types of combination code images (P61 to P63).

Figure 28:
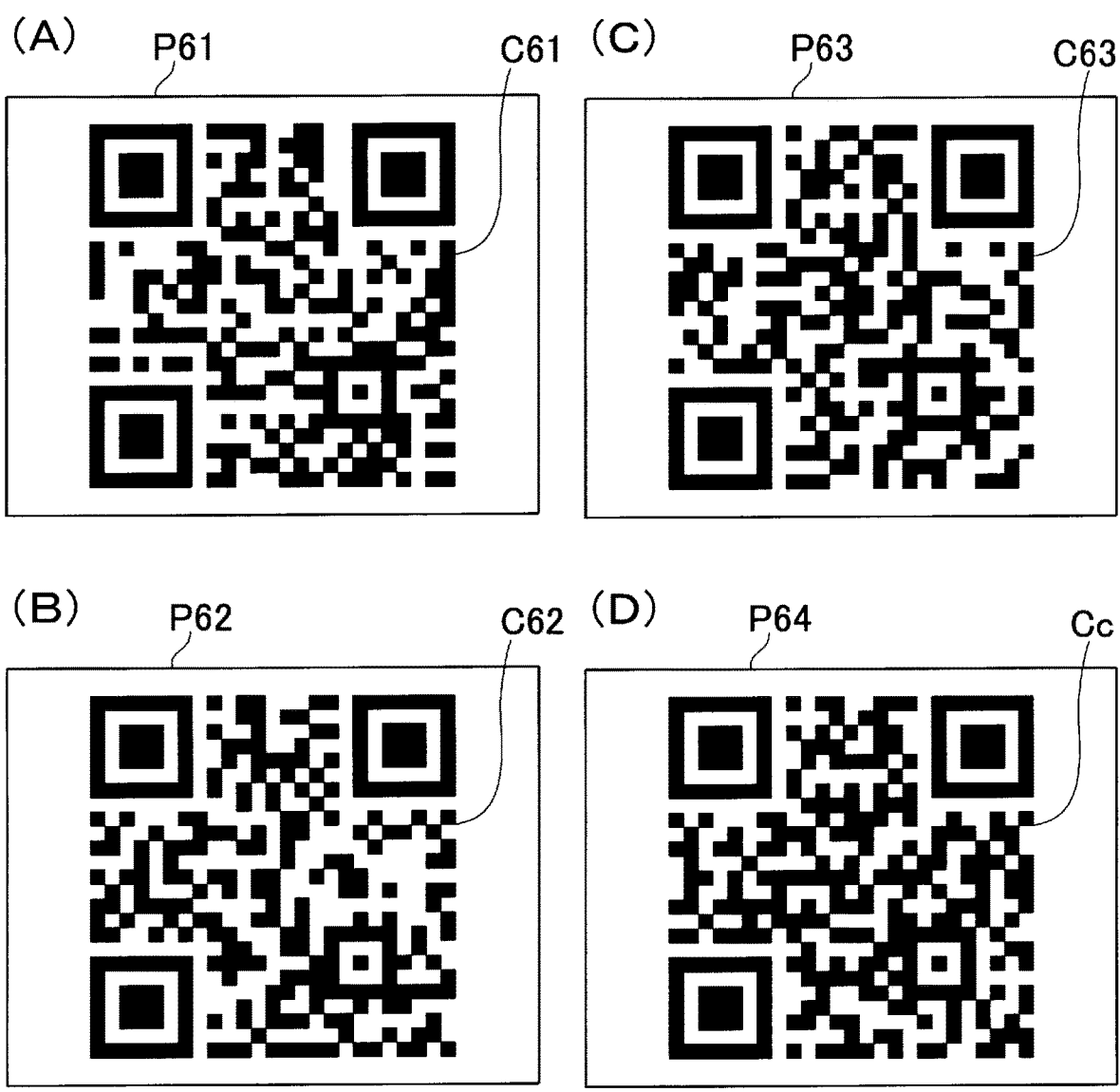

Thus, the information code reading device 30*a* can read the predetermined rule from the information code Cc which is imaged together with the plurality of types of combination code images. Therefore, the information code reading device 30*a* is not required to acquire the information related to the predetermined rule in advance. Since the predetermined rule can be changed for each information code, security can be improved, while enhancing convenience of the system. It should be noted that the information code Cc may be produced, as shown in FIG. 28(D), as a QR code having the same code size and cell size as those of the combination codes, or may be produced as a different type of information code, such as Data Matrix code or MaxiCode, so as to be easily distinguished from the combination codes.

The configuration in which an image of a different information code, on which the information related to the predetermined rule is recorded, is cyclically displayed on the screen together with the combination code images, can be applied to the fourth embodiment and other embodiments.

Furthermore, the present embodiment and other embodiments may also use the area Cf or the like corresponding to the format information area of a QR code having an error correction function, so that the combination code images can be produced to individually include the information and the like related to the predetermined rule. With this configuration as well, the information code reading device 30a is not required to acquire the information related to the predetermined rule in advance. Since the predetermined rule can be changed for each information code, security can be improved, while enhancing convenience of the system.

Eighth Embodiment

Next, referring to the drawings, an information code reading system according to an eighth embodiment will be described.

The eighth embodiment is mainly different from the seventh embodiment in that a plurality of predetermined combination areas targeted to cell replacement are set, and the predetermined rule related to cell replacement is different between the predetermined combination areas. Accordingly, the same reference signs are designated to the components which are substantially the same as those of the seventh embodiment to omit repeated explanation.

Figure 29:
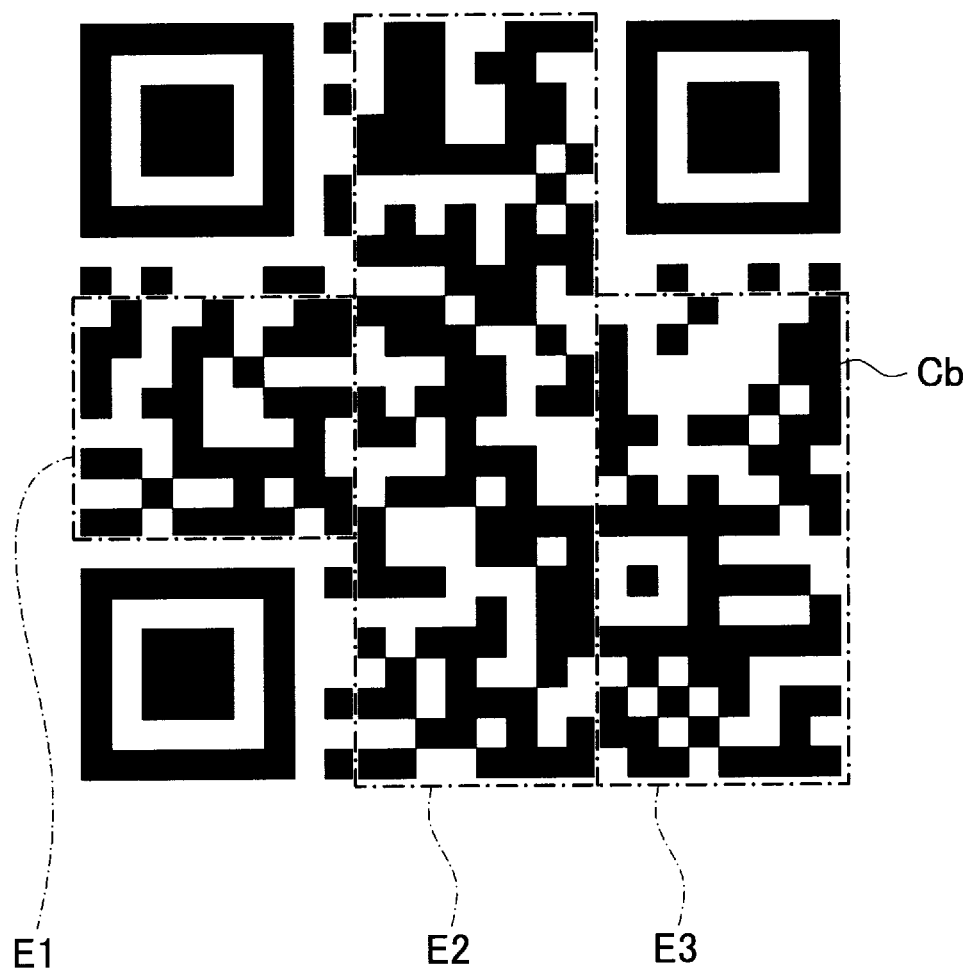
FIG. 29 is a diagram illustrating a principal part of an information code reading system according to an eighth embodiment.

Specifically, as in an original code Cb shown in FIG. 29, for example, three combination areas E1, E2 and E3 are provided to the data recording area, and the rule related to cell replacement in the combination area E1, the rule related to cell replacement in the combination area E2, and the rule related to cell replacement in the combination area E3 are different from each other. In this case, for example, the combination areas may be set so that the simple majority rule for the number of cells is used for the rule of the combination area E1, logical OR (OR) is used for the rule of the combination area E2, and exclusive OR (XOR) is used for the rule of the combination area E3.

Thus, since the rule related to cell replacement is differently set between the plurality of combination areas, if the predetermined rule set for one combination area is fraudulently acquired, the original code on which predetermined information is recorded cannot be decodably composed, unless other predetermined rules or information related to the combination areas including other predetermined rules are acquired. Accordingly, security can be further improved for the information code displayed on the screen.

In the present embodiment as well, an image of a different information code, on which information related to rules for cell replacement is recorded, may be cyclically displayed on the screen together with the combination code images. Furthermore, the area Cf or the like corresponding to the format information area of a QR code having an error correction function may be used, so that the combination code images can individually include information related to rules for cell replacement and other information.

The number of combination areas provided to the data recording area is not limited to three, but two, or four or more combination areas may be provided to at least part of the data recording area.

The present embodiment should not be construed as being limited to the embodiments and modifications described above, but may be embodied as follows.

(1) The information code reading device 30 is not limited to being configured by a tablet terminal or the like, but may be configured by a reading device dedicated to reading information codes, e.g., a handy scanner or the like having no display screen.

(2) The second rule transmitted to the information code reading device 30 may include information related to an expiration period corresponding to the predetermined period, so that when the expiration period has elapsed after the information code reading device 30 received the second rule, the information code reading device 30 can again make a second request to the server 40.

(3) As described above, the present invention is not limited to being adopted to a CPM (computer presented mode) payment system in which payment is performed by allowing the store side information code reading device 30 to read the display screen of the purchaser side information code display device 20, but may be adopted to an MPM (merchant presented mode) payment system in which payment is performed by allowing the purchaser side information code reading device 30 to read the display screen of the store side information code display device 20.

(4) The present invention is not limited to being adopted to a payment system utilizing information codes, but may be adopted to a system in which information is transmitted from the information code display device 20 to the information code reading device 30, using reading of an information code.

(5) In the first embodiment and other embodiments described above, the information code C that is an original information code to be composed is not limited to being configured as a QR code, but may be configured as a different type information code, e.g., a two-dimensional code, such as a Data Matrix code or MaxiCode, having dark color-based cells and light color-based cells, or may be configured as a one-dimensional code, such as a barcode.

(6) In the first embodiment and other embodiments described above, as a first rule set by the server 40 according to a first request, several data for three types of parameters, i.e., the number of segments of an information code, segmenting positions, and frame rate, are not limited to being selectively prepared, but different types of parameters related to display of an information code may be selectively prepared. In this case, the server 40 can also set the second rule so that parameters thereof can be selected according to the first rule.

(7) In the third embodiment, the cyclically displayed information codes are each not limited to being configured as a QR code, but may be configured as a different type information code having dark color-based cells and light color-based cells, e.g., a two-dimensional code, such as Data Matrix code and MaxiCode, or may be configured as a one-dimensional code, such as a barcode.

(8) In the third embodiment, as a first rule set by the server 40 according to a first request, several items of data for two types of parameters, i.e., the number of displaying information codes and frame rate, are not limited to being selectively prepared, but different types of parameters related to display of an information code may be selectively prepared. In this case, the server 40 can also set the second rule so that parameters thereof can be selected according to the first rule.

(9) The cells configuring the information code C or the like are not limited to light color-based cells and dark color-based cells, but may be several types of color cells.

REFERENCE SIGNS LIST 10, 10a . . . Information code reading system
20, 20a . . . Information code display device 21 ... Control unit (partial code image preparation unit, determination unit, production unit)
22 ... Memory unit (partial code image preparation unit)
24 ... Display unit
26 ... Communication unit (display side communication unit)
30, 30a ... Information code reading device
31 ... Control unit (combination unit, decoding unit)
32 ... Memory unit
33 ... Imaging unit
34 ... Display unit (notification unit)
36 ... Communication unit (reading side communication unit)
40 ... Server
41 ... Control unit (setting unit)
43 ... Communication unit (server side communication unit)
C ... Information code
Ca, Cb ... Original code
C11 to C13, C21 to C24, C31 to C33 ... Partial code
C41 to C43, C51 to C53, C6a to C63 ... Combination code
P11 to P13, P21 to P24, P31 to P33 ... Partial code image
P41 to P43, P51 to P53, P61 to P63 ... Combination code image

What is claimed is:

1. An information code reading system comprising an information code display device, an information code reading device, and a server that can communicate with the information code display device and the information code reading device, wherein
the information code display device includes
a display side communication unit that receives a first rule transmitted from the server in response to a first request to the server,
a partial code image preparation unit that prepares a plurality of types of partial code images when the first rule is received by the display side communication unit, each partial code image being produced as a result of removing part of cells configuring a code area of an information code, on which predetermined information is recorded, from an image of the information code so as to meet the first rule, and
a display unit that cyclically displays the plurality of partial code images prepared by the partial code image preparation unit on a display screen, based on the first rule;
the information code reading device includes
a reading side communication unit that receives a second rule transmitted from the server in response to a second request to the server,
an imaging unit that captures images of the display screen at imaging intervals according to the second rule when the second rule is received by the reading side communication unit,
a combination unit that composes one information code from a plurality of images captured by the imaging unit, based on the second rule, and
a decoding unit that decodes the information code composed by the combination unit; and
the server includes
a setting unit that sets a rule related to display of the partial code images according to time of receiving the first rule or the second rule, and
a server side communication unit that transmits a rule to the information code display device as the first rule when the first request is received from the information code display device, the rule being set by the setting unit according to time of receiving the first request, and transmits a rule to the information code reading device as the second rule when the second request is received from the information code reading device, the rule being set by the setting unit according to time of receiving the second request.

2. An information code reading system comprising an information code display device, an information code reading device, and a server that can communicate with the information code display device and the information code reading device, wherein
the information code display device includes
a display side communication unit that receives a first rule transmitted from the server in response to a first request to the server,
a storage unit that stores a plurality of information codes, and
a display unit that cyclically displays the plurality of information codes on a display screen based on the first rule received by the display side communication unit;
the information code reading device includes
a reading side communication unit that receives a second rule transmitted from the server in response to a second request to the server,
an imaging unit that captures images of the display screen at imaging intervals according to the second rule when the second rule is received by the reading side communication unit,
a decoding unit that performs decoding processing in which an information code is decoded for the plurality of serial images captured by the imaging unit, and
a notification unit that performs predetermined notification in the case where decoding results of decoding the serial images performed by the decoding unit are different from results estimated from the second rule; and
the server includes
a setting unit that sets a rule related to display of information codes according to time of receiving the first rule or the second rule, and
a server side communication unit that transmits a rule to the information code display device as the first rule when the first request is received from the information code display device, the rule being set by the setting unit according to time of receiving the first request, and transmits a rule to the information code reading device as the second rule when the second request is received from the information code reading device, the rule being set by the setting unit according to time of receiving the second request.

3. The information code reading system according to claim 1, wherein
the first rule includes information related to an expiration period; and
the display side communication unit newly requests the first rule to the server after the lapse of the expiration period included in the first rule after receiving the first rule.

4. The information code reading system according to claim 3, wherein
the information code display device includes
a determination unit that determines, when receiving the first rule, whether display conditions following the first rule are display conditions that are acceptable to the display unit, and a production unit that produces a display condition code as an information code when the determination unit determines that the display conditions are not acceptable to the display unit, the information code recording information related to display conditions that are acceptable to the display unit, and specific information that can specify the information code display device;

the display unit displays the display condition code on the display screen when the display condition code is produced by the production unit;

in the information code reading device, when the display condition code has been decoded by the decoding unit, the reading side communication unit makes the second request including the decoding results for the display condition code; and in the server, when the second request including the decoding results for the display condition code is received from the information code reading device, the setting unit sets the first rule and the second rule so as to change display conditions according to the decoding results, and the server-side communication unit respectively transmits the first rule and the second rule set by the setting unit to the information code display device and the information code reading device.

5. The information code reading system according to claim 1, wherein the information code display device includes a determination unit that determines, when receiving the first rule, whether display conditions following the first rule are display conditions that are acceptable to the display unit, and a production unit that produces a display condition code as an information code when the determination unit determines that the display conditions are not acceptable to the display unit, the information code recording information related to display conditions that are acceptable to the display unit, and specific information that can specify the information code display device;

the display unit displays the display condition code on the display screen when the display condition code is produced by the production unit;

in the information code reading device, when the display condition code has been decoded by the decoding unit, the reading side communication unit makes the second request including the decoding results for the display condition code; and in the server, when the second request including the decoding results for the display condition code is received from the information code reading device, the setting unit sets the first rule and the second rule so as to change display conditions according to the decoding results, and the server-side communication unit respectively transmits the first rule and the second rule set by the setting unit to the information code display device and the information code reading device.

6. The information code reading system according to claim 2, wherein the first rule includes information related to an expiration period; and the display side communication unit newly requests the first rule to the server after the lapse of the expiration period included in the first rule after receiving the first rule.

7. The information code reading system according to claim 6, wherein the information code display device includes a determination unit that determines, when receiving the first rule, whether display conditions following the first rule are display conditions that are acceptable to the display unit, and a production unit that produces a display condition code as an information code when the determination unit determines that the display conditions are not acceptable to the display unit, the information code recording information related to display conditions that are acceptable to the display unit, and specific information that can specify the information code display device;

the display unit displays the display condition code on the display screen when the display condition code is produced by the production unit;

in the information code reading device, when the display condition code has been decoded by the decoding unit, the reading side communication unit makes the second request including the decoding results for the display condition code; and in the server, when the second request including the decoding results for the display condition code is received from the information code reading device, the setting unit sets the first rule and the second rule so as to change display conditions according to the decoding results, and the server-side communication unit respectively transmits the first rule and the second rule set by the setting unit to the information code display device and the information code reading device.

8. The information code reading system according to claim 2, wherein the information code display device includes a determination unit that determines, when receiving the first rule, whether display conditions following the first rule are display conditions that are acceptable to the display unit, and a production unit that produces a display condition code as an information code when the determination unit determines that the display conditions are not acceptable to the display unit, the information code recording information related to display conditions that are acceptable to the display unit, and specific information that can specify the information code display device;

the display unit displays the display condition code on the display screen when the display condition code is produced by the production unit;

in the information code reading device, when the display condition code has been decoded by the decoding unit, the reading side communication unit makes the second request including the decoding results for the display condition code; and in the server, when the second request including the decoding results for the display condition code is received from the information code reading device, the setting unit sets the first rule and the second rule so as to change display conditions according to the decoding results, and the server-side communication unit respectively transmits the first rule and the second rule set by the setting unit to the information code display device and the information code reading device.

9. An information code reading system comprising an information code display device and an information code reading device, wherein the information code display device includes a code image preparation unit that prepares a plurality of types of combination code images according to a predetermined rule, with part of cells replaced, by changing positions of replacement cell areas as targets of replacement, based on an information code on which predetermined information is recorded using cells arranged in a code area, and a display unit that cyclically displays the plurality of types of combination code images prepared by the code image preparation unit on a display screen; and the information code reading device includes an imaging unit that captures images of the display screen at predetermined imaging intervals, a combination unit that composes one information code according to the predetermined rule, from a plurality of images captured by the imaging unit, and a decoding unit that decodes an information code composed by the combination unit.

10. The information code reading system according to claim 9, wherein cells in the replacement cell areas form part of a predetermined cell pattern corresponding to the code area.

11. The information code reading system according to claim 9, wherein part of the code area is formed by arranging a plurality of data blocks each formed of a predetermined number of cells;

the replacement cell areas are set in units of data blocks; and the predetermined rule is set for the data blocks located at the same positions, so that one of the plurality of types of combination code images includes a cell arrangement that is the same as that of the code area, and that the remaining combination code images include replacement cell areas.

12. The information code reading system according to claim 11, wherein the display unit cyclically displays determination code images on the display screen, in addition to the plurality of types of combination code images prepared by the code image preparation unit, the determination code images recording determination information for determining for each data block whether cell arrangement is the same as that of the code area.

13. The information code reading system according to 9, wherein the information code reading device includes a storage unit in which information related to the predetermined rule is stored in advance.

14. The information code reading system according to 9, wherein the plurality of types of combination code images individually include information related to the predetermined rule.

15. The information code reading system according to claim 9, wherein the code image preparation unit prepares a plurality of types of first combination code images from a first information code image on which first information is recorded, the plurality of types of first combination code images being individually prepared so that part of cells forming a code area of the first information code is replaced to meet the predetermined rule, and prepares a plurality of types of second combination code images from a second information code image on which second information is recorded, the plurality of types of second combination code images being individually prepared so that part of cells forming a code area of the second information code is replaced to meet the predetermined rule;

the plurality of types of first combination code images and the plurality of types of second combination code images prepared by the code image preparation unit are cyclically displayed on the display screen of the display unit; and the combination unit composes the first information code and the second information code from the plurality of images captured by the imaging unit, based on the predetermined rule.

16. The information code reading system according to claim 9, wherein the code image preparation unit produces and prepares a plurality of types of the combination code images, so that for cells located at the same positions in a predetermined combination area targeted to cell replacement in the code area, light and darkness obtained from light and darkness of cells of the plurality of types of combination code images and the predetermined rule match light and darkness of cells of the information code.

17. The information code reading system according to claim 16, wherein a plurality of predetermined combination areas are set; and the predetermined rule is different between the predetermined combination areas.

18. The information code reading system according to claim 9, wherein other information code images, on which information related to the predetermined rule is recorded, are cyclically displayed on the display screen of the display unit, in addition to the plurality of types of combination code images prepared by the code image preparation unit.

* * * * *